United States Patent
Li et al.

(10) Patent No.: US 12,376,160 B2
(45) Date of Patent: Jul. 29, 2025

(54) RELAY COMMUNICATION METHOD AND RELATED DEVICE

(71) Applicant: Huawei Technologies Co., Ltd., Shenzhen (CN)

(72) Inventors: Xiangyu Li, Shanghai (CN); Mingzeng Dai, Shenzhen (CN); Peng Zhang, Shanghai (CN); Jun Wang, Shanghai (CN); Qinghai Zeng, Shanghai (CN); Hua Xu, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 356 days.

(21) Appl. No.: 17/932,738

(22) Filed: Sep. 16, 2022

(65) Prior Publication Data
US 2023/0019346 A1    Jan. 19, 2023

Related U.S. Application Data

(63) Continuation of application No. PCT/CN2021/078308, filed on Feb. 27, 2021.

(30) Foreign Application Priority Data

Mar. 18, 2020  (CN) .......................... 202010190578.3

(51) Int. Cl.
*H04W 76/10* (2018.01)
*H04L 1/1812* (2023.01)
(Continued)

(52) U.S. Cl.
CPC ........... *H04W 76/10* (2018.02); *H04L 1/1812* (2013.01); *H04W 80/02* (2013.01); *H04W 88/04* (2013.01)

(58) Field of Classification Search
CPC ..... H04W 76/10; H04W 80/02; H04W 88/04; H04W 28/0273; H04W 40/22;
(Continued)

(56) References Cited

U.S. PATENT DOCUMENTS 10,021,596 B2 * 7/2018 Chiu ....................... H04L 69/22
10,411,789 B2   9/2019 Loehr et al.
(Continued)

FOREIGN PATENT DOCUMENTS

CN    108141729 A    6/2018

OTHER PUBLICATIONS

Intel Corporation, "Adaptation layer and Routing for IAB in NR", 3GPP TSG RAN WG2 Meeting #101bis, R2-1805685, Apr. 16-20, 2018, 6 Pages, Sanya, China.
(Continued)

*Primary Examiner* — Abdullahi Ahmed
(74) *Attorney, Agent, or Firm* — Slater Matsil, LLP

(57)    ABSTRACT

A relay device first receives a data packet from a network device through a first link, and sends the data packet to user equipment through a second link. A protocol stack of the relay device consists of a physical layer, a media access control layer, and a segmentation function or a resegmentation function of a radio link control layer; a protocol stack of the relay device consists of a physical layer, a media access control layer, a segmentation function or a resegmentation function of a radio link control layer, and an adaptation layer; or a protocol stack of the relay device consists of a physical layer and a hybrid automatic repeat request function of a media access control layer. The first link is a wireless communication link between the network device and the relay device, and the second link is a wireless direct communication link between the relay device and the user equipment.

20 Claims, 16 Drawing Sheets

(51) Int. Cl.
*H04W 80/02* (2009.01)
*H04W 88/04* (2009.01)

(58) Field of Classification Search
CPC ...... H04W 28/14; H04W 4/06; H04L 1/1812; H04L 2001/0097
See application file for complete search history.

(56) References Cited

U.S. PATENT DOCUMENTS

| | | | |
|---|---|---|---|
| 2017/0111754 A1* | 4/2017 | Baghel | H04W 76/27 |
| 2017/0289845 A1* | 10/2017 | Chiu | H04W 28/065 |
| 2017/0331577 A1 | 11/2017 | Parkvall et al. | |
| 2021/0051653 A1* | 2/2021 | Park | H04W 8/22 |
| 2021/0084558 A1* | 3/2021 | Speicher | H04W 36/22 |
| 2022/0408342 A1* | 12/2022 | Lu | H04W 40/246 |
| 2023/0199614 A1* | 6/2023 | Wang | H04W 40/22 |
| | | | 370/315 |
| 2023/0337299 A1* | 10/2023 | Zhang | H04L 45/66 |
| 2024/0098814 A1* | 3/2024 | Paladugu | H04W 8/005 |
| 2024/0147516 A1* | 5/2024 | Kawano | H04W 24/08 |

OTHER PUBLICATIONS

Huawei., "Overview on IAB", 3GPP TSG-RAN WG3#99bis, R2-181998, Apr. 16-20, 2018, 6 Pages, Sanya, China.
Huawei, "Adaptation layer based L2 relaying and light L2 relaying", 3GPP TSG-RAN WG3 #99, R3-180814, Feb. 26-Mar. 2, 2018, 9 Pages, Athens, Greece.

* cited by examiner

RELAY COMMUNICATION METHOD AND RELATED DEVICE

CROSS-REFERENCE TO RELATED APPLICATIONS

This application is a continuation of International Application No. PCT/CN2021/078308, filed on Feb. 27, 2021, which claims priority to Chinese Patent Application No. 202010190578.3, filed on Mar. 18, 2020. The disclosures of the aforementioned applications are hereby incorporated by reference in their entireties.

TECHNICAL FIELD

This application relates to the field of communication technologies, and more specifically, to a relay communication method and a related device.

BACKGROUND

In a relay communication scenario, a relay device is required for communication between a network device and user equipment (UE). However, in an existing mechanism, the relay device has a complete communication protocol stack, for example, a complete LTE protocol stack or NR protocol stack. This causes a problem of an excessively long latency in relay. When low-latency communication is increasingly emphasized, an urgent problem of a long latency in relay communication needs to be resolved.

SUMMARY

In view of this, this application provides a communication method and a related device, to reduce a latency in relay communication, thereby improving performance of an entire network.

According to a first aspect, this application provides a communication method. The method includes: A relay device receives a data packet from a network device through a first link and sends the data packet to user equipment through a second link. A protocol stack of the relay device consists of a physical layer, a media access control layer, and a segmentation function or a resegmentation function of a radio link control layer; a protocol stack of the relay device consists of a physical layer, a media access control layer, a segmentation function or a resegmentation function of a radio link control layer, and an adaptation layer; a protocol stack of the relay device consists of a physical layer and a hybrid automatic repeat request function of a media access control layer; or a protocol stack of the relay device consists of a physical layer, a hybrid automatic repeat request function of a media access control layer, and an adaptation layer. The first link is a wireless communication link between the network device and the relay device, and the second link is a wireless direct communication link between the relay device and the user equipment. According to the method, example beneficial effects include: The protocol stack of the relay device is simplified; data packet processing performed by the relay device is simplified; and a transmission latency of the data packet is reduced.

In a first feasible design of the first aspect, that a relay device receives a data packet from a network device through a first link and sends the data packet to user equipment through a second link may include: The relay device first receives the data from the network device based on a first multicast radio network temporary identifier through the first link. The relay device then obtains a first destination layer 2 identifier based on the first multicast radio network temporary identifier, where there is a correspondence between the first multicast radio network temporary identifier and the first destination layer 2 identifier. The relay device finally sends the data to the user equipment based on the first destination layer 2 identifier through the second link. According to the method, example beneficial effects include: A plurality of relay devices may serve the user equipment by using a multicast identifier, thereby improving stability and efficiency of relay communication; and the user equipment may obtain the first destination layer 2 identifier based on the first multicast radio network temporary identifier, to perform data forwarding.

Based on the first feasible design of the first aspect, a second feasible design of the first aspect may include: The relay device receives the first multicast radio network temporary identifier and the first destination layer 2 identifier from the network device, where there is the correspondence between the first multicast radio network temporary identifier and the first destination layer 2 identifier. According to the design, example beneficial effects include: The network device may configure the correspondence between the first multicast radio network temporary identifier and the first destination layer 2 identifier as required, to perform data forwarding more flexibly.

Based on the first feasible design of the first aspect or the second feasible design of the first aspect, a third feasible design of the first aspect may include: The first destination layer 2 identifier is included in a media access control layer header of the data, and the first destination layer 2 identifier is used to identify the user equipment.

Based on the first aspect or any one of the foregoing feasible designs of the first aspect, in a fourth feasible design of the first aspect, the data from the network device includes a first bearer identifier and/or a second bearer identifier. According to the design, example beneficial effects include: A bearer mapping function may be further added to mapping between a G-RNTI and a destination identifier. This may further ensure implementation of multi-bearer relay communication on a relay device side.

Based on the first aspect or any one of the foregoing feasible designs of the first aspect, in a fifth feasible design of the first aspect, the data sent from the relay device to the user equipment may include the first bearer identifier and/or the second bearer identifier. According to the method, example beneficial effects include: A bearer identifier is included in the data on the second link, so that implementation of multi-bearer relay communication on a user equipment side may be further ensured.

Based on the fourth feasible design or the fifth feasible design of the first aspect, in a sixth feasible design of the first aspect, a bearer includes one or more of a signaling radio bearer, a data radio bearer, a radio link control bearer, or a media access control bearer.

Based on the fourth to the sixth feasible designs of the first aspect, in a seventh feasible design of the first aspect, the relay device receives the data from the network device through a first bearer; the relay device determines the second bearer identifier based on the first bearer identifier, where there is a correspondence between the first bearer identifier and the second bearer identifier; and the relay device sends the data to the user equipment based on the second bearer identifier.

Based on the fourth to the seventh feasible designs of the first aspect, in an eighth feasible design of the first aspect, the first bearer identifier and/or the second bearer identifier are/is included in an adaptation layer header, a radio link control layer header, or a media access control layer header of the data. According to the method, example beneficial effects include: Implementation of multi-bearer relay communication is ensured.

According to a second aspect, this application provides a communication method. The method may include: A relay device receives data from a network device based on a first radio network temporary identifier through a first link, where the data includes routing information and/or a bearer identifier; the relay device obtains the routing information and/or the bearer identifier from the data; and the relay device sends the data to the user equipment based on the routing information and/or the bearer identifier through a second link. The first link is a wireless communication link between the network device and the relay device, and the second link is a wireless direct communication link between the relay device and the user equipment. According to the method, example beneficial effects include: The data packet includes the routing information and/or the bearer identifier, so that simpler data forwarding is performed. Compared with the method in the first aspect, in this method, the network device does not need to configure a correspondence, so that air interface overheads are reduced, and radio network temporary identifier resources are saved.

In a first feasible design of the second aspect, the routing information and/or the bearer identifier may be included in a radio link control layer header or an adaptation layer header of the data packet. According to the design, example beneficial effects include: The relay device can perform data forwarding based on the routing information and/or the bearer identifier in the radio link control layer header or the adaptation layer header.

According to a third aspect, this application provides a communication method. The method includes: A network device sends, to a relay device, a data packet of user equipment through a first link. A protocol stack of the relay device consists of a physical layer, a media access control layer, and a segmentation function or a resegmentation function of a radio link control layer; a protocol stack of the relay device consists of a physical layer, a media access control layer, a segmentation function or a resegmentation function of a radio link control layer, and an adaptation layer; a protocol stack of the relay device consists of a physical layer and a hybrid automatic repeat request function of a media access control layer; or a protocol stack of the relay device consists of a physical layer, a hybrid automatic repeat request function of a media access control layer, and an adaptation layer. There is a second link between the relay device and the user equipment. The first link is a wireless communication link between the network device and the relay device, and the second link is a wireless direct communication link between the relay device and the user equipment.

In a first feasible design of the third aspect, that a network device sends, to a relay device, a data packet of user equipment through a first link includes: sending, to the relay device, the data of the user equipment based on a first multicast radio network temporary identifier through the first link.

Based on the first aspect or the first feasible design of the first aspect, in a second feasible design of the third aspect, the network device sends the first multicast radio network temporary identifier and a first destination layer 2 identifier to the relay device, where there is a correspondence between the first multicast radio network temporary identifier and the first destination layer 2 identifier.

Based on the first aspect and the first to the third feasible designs of the third aspect, the network device sends, to the relay device, the data of the user equipment through a first bearer.

According to a fourth aspect, this application provides a communication method. The method includes: User equipment receives, from a relay device, data from a network device through a second link. A protocol stack of the relay device consists of a physical layer, a media access control layer, and a segmentation function or a resegmentation function of a radio link control layer; a protocol stack of the relay device consists of a physical layer, a media access control layer, a segmentation function or a resegmentation function of a radio link control layer, and an adaptation layer; a protocol stack of the relay device consists of a physical layer and a hybrid automatic repeat request function of a media access control layer; or a protocol stack of the relay device consists of a physical layer, a hybrid automatic repeat request function of a media access control layer, and an adaptation layer. There is the second link between the relay device and the user equipment. A first link is a wireless communication link between the network device and the relay device, and the second link is a wireless direct communication link between the relay device and the user equipment.

According to a fifth aspect, this application provides a communication apparatus. The communication apparatus is configured to perform the method in the first aspect to the fourth aspect and any design thereof.

According to a sixth aspect, this application provides an apparatus. The apparatus may include at least one processor and an interface circuit. Related program instructions are executed in the at least one processor, to enable the communication apparatus to perform the method in the first aspect to the fourth aspect and any design thereof. The apparatus may be a terminal device or a network device, or a chip in the terminal device or in the network device according to the method in the first aspect to the fourth aspect and any design thereof. Optionally, the communication apparatus may further include at least one memory, and the memory stores the related program instructions.

According to a seventh aspect, this application provides a computer-readable storage medium. The computer-readable storage medium may be used in a communication apparatus. The computer-readable storage medium stores related program instructions. When the related program instructions are run, the communication apparatus is enabled to perform the method in the first aspect to the fourth aspect and any design thereof.

According to an eighth aspect, this application provides a computer program product. The computer program product includes related program instructions; and when the related program instructions are executed, the method in the first aspect to the fourth aspect and any design thereof can be performed.

BRIEF DESCRIPTION OF THE DRAWINGS

The accompanying drawings, which may be included in this specification and constitute a part of this specification, together with this specification show example embodiments, or features and aspects of this application, and are used to explain principles of this application. It is clear that the accompanying drawings in the following descriptions merely show some embodiments of this application, and a person of ordinary skill in the art can derive other drawings from these accompanying drawings without creative efforts.

DETAILED DESCRIPTION OF ILLUSTRATIVE EMBODIMENTS

Figure 1:
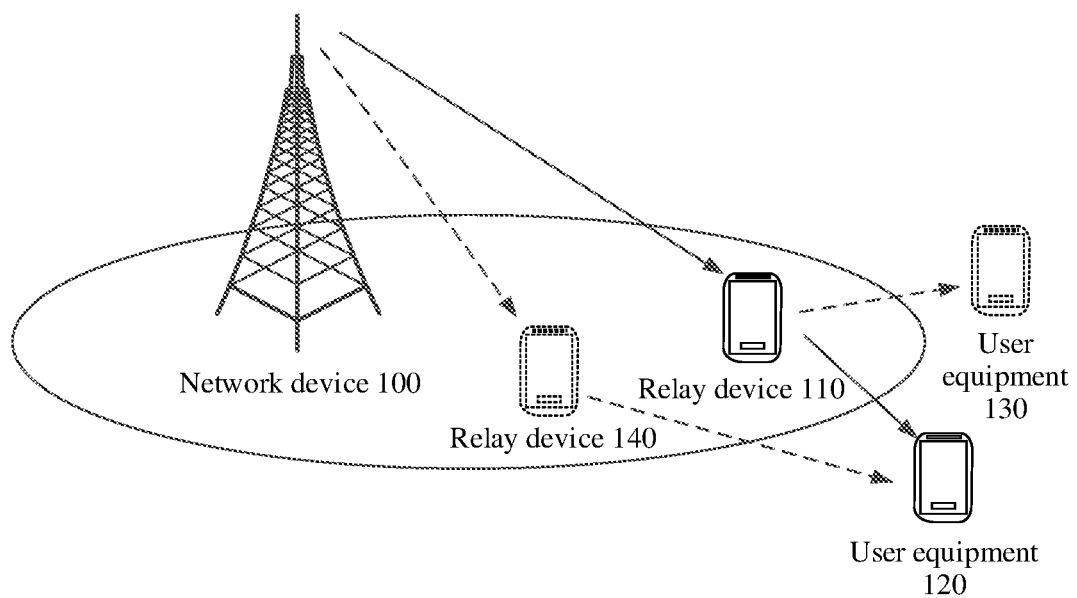
FIG. 1 is a schematic diagram of a possible relay communication system according to this application.

In descriptions of this application, terms such as "first", "second", "operation 201", or "operation 202" are merely used for distinguishing descriptions and for ease of organizing this article. Different sequences or numbers do not have specific technical meanings, and cannot be understood as indicating or implying relative importance, or indicating or implying an execution sequence of operations.

The term "and/or" in this application describes only an association relationship for associated objects, and represents that three relationships may exist. For example, "A and/or B" may represent the following three cases: Only A exists; both A and B exist; or only B exists. A and B may be singular or plural. In addition, the character "/" in this specification indicates an "or" relationship between the associated objects.

In this application, "transmission" may include the following three cases: data sending, data receiving, or data sending and data receiving. In this application, "data" may include service data and/or signaling data.

The terms "include", "contain" and any other variants thereof, are intended to cover a non-exclusive inclusion. For example, a process/method that includes a series of steps or a system/product/device that includes a series of units may not be necessarily limited to those expressly listed steps or units, but may include other steps or units not expressly listed or inherent to these processes/methods/products/devices.

The solutions provided in embodiments of this application may be applied to various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a worldwide interoperability for microwave access (WiMAX) communication system, a 5th generation (5G) mobile communication system, a new radio (NR) system, or another network system that can be used to provide a mobile communication service. This is not limited in this application.

The following describes embodiments of this application with reference to the drawings. Features or content marked by dashed lines in the drawings may be understood as optional operations or optional structures of embodiments of this application.

As shown in FIG. 1, a communication system that is applicable to an embodiment of this application may include a network device 100, a relay device 110, and user equipment 120, and may optionally include user equipment 130 or a relay device 140. The network device 100 may communicate with the user equipment 120 via the relay device 110. The network device 100 may communicate with the relay device 110 through a wireless communication interface, for example, an LTE Uu interface or an NR Uu interface. The LTE Uu interface or the NR Uu interface may be a wireless communication interface between a radio access network (radio access network, RAN) device and a terminal device in a cellular communication system. A wireless communication link used for uplink communication between a terminal device and a network device through the LTE Uu interface or the NR Uu interface may be referred to as an uplink (Uplink, UL), and a wireless communication link used for downlink communication between the terminal device and the network device through the LTE Uu interface or the NR Uu interface may be referred to as a downlink (DL). The relay device 110 may communicate with the user equipment 120 through a wireless direct communication interface, for example, a D2D interface or a PC5 interface. The D2D interface or the PC5 interface may be a wireless communication interface for direct communication between terminal devices. Through the D2D interface or the PC5 interface, the terminal devices may not need to forward data via a cellular communication network, so that the data is directly exchanged. A communication link used for direct communication between terminal devices through the PC5 interface may be referred to as a sidelink (SL). Alternatively, the relay device 110 may communicate with the user equipment 120 through microwave, Wi-Fi, Bluetooth, or the like. The network device 100 may further communicate with the user equipment 120 and the user equipment 130 via the relay device 110. The network device 100 may further communicate with the user equipment 120 via the relay device 110 and the relay device 140. It should be noted that, the network architecture shown in FIG. 1 is merely an example of the architecture. Other than the network functional entities shown in FIG. 1, the communication system shown in FIG. 1 may further include another functional entity, for example, a core network element, more user equipment, or more relay devices. This is not limited in this application. In addition, in FIG. 1, an example in which the user equipment 120 and the user equipment 130 are located at an edge of or outside a coverage area of the network device is used. Alternatively, the user equipment 120 or 130 may be located at an edge of or within the coverage area of the network device, for example, when there may be no proper communication resource between the user equipment and the network device, or when a communication resource between the user equipment and the network device is not as good as a communication resource between the relay device and the network device.

The user equipment in FIG. 1 may be an access terminal device, a subscriber unit, a subscriber station, a mobile station, a remote station, a remote terminal device, a mobile device, a user terminal device, a wireless terminal device, a user agent, a user apparatus, or the like. The user equipment may alternatively be a cellular phone, a cordless phone, a session initiation protocol (SIP) phone, a wireless local loop (WLL) station, a personal digital assistant (PDA), a hand-held device having a wireless communication function, a computing device, another processing device connected to a wireless modem, a vehicle-mounted device, a wearable device (such as a smartwatch or a smart band), smart furniture or a home appliance, a terminal device in a 5G network, a terminal device in a future evolved public land mobile network (PLMN), a vehicle device in vehicle-to-everything (V2X), a customer premises equipment (CPE), or the like. A specific implementation form of the user equipment is not limited in this application.

The network device in FIG. 1 may be configured to implement functions such as a radio physical entity, resource scheduling and radio resource management, or radio access control and mobility management. For example, the network device may be a radio access network (RAN) device, for example, may be a base station (BTS) in a GSM system or a CDMA system, a NodeB (NB) in a WCDMA system, an evolved NodeB (eNB) in an LTE system, a radio controller in a cloud radio access network (C-RAN) scenario, a relay node station, a transmission reception point (TRP), an access point, a vehicle-mounted device, a road side unit (RSU), a wearable device, a network device in a 5G network such as an NR NodeB or a next generation base station (gNB), a centralized unit (CU), a distributed unit (DU), or a network device in a future evolved PLMN network. A specific implementation form of the network device is not limited in this application.

The relay device in FIG. 1 may be a communication device having a relay function. In addition to the relay function, the communication device may further have a normal communication function. For example, the relay function is specially used by the network device to perform relay communication with the user equipment, and serves the user equipment. The normal communication function is specially used by the network device to perform direct communication with the relay device, and serves the relay device. For example, the relay device may be cooperated user equipment (CUE) in a network assisted UE cooperation (NAUC) communication scenario. For another example, the relay device may be an JAB node in an integrated access and backhaul (IAB) communication scenario. For still another example, the relay device may be relay user equipment (relay UE) in a vehicle-to-everything (V2X) communication scenario.

Figure 2:
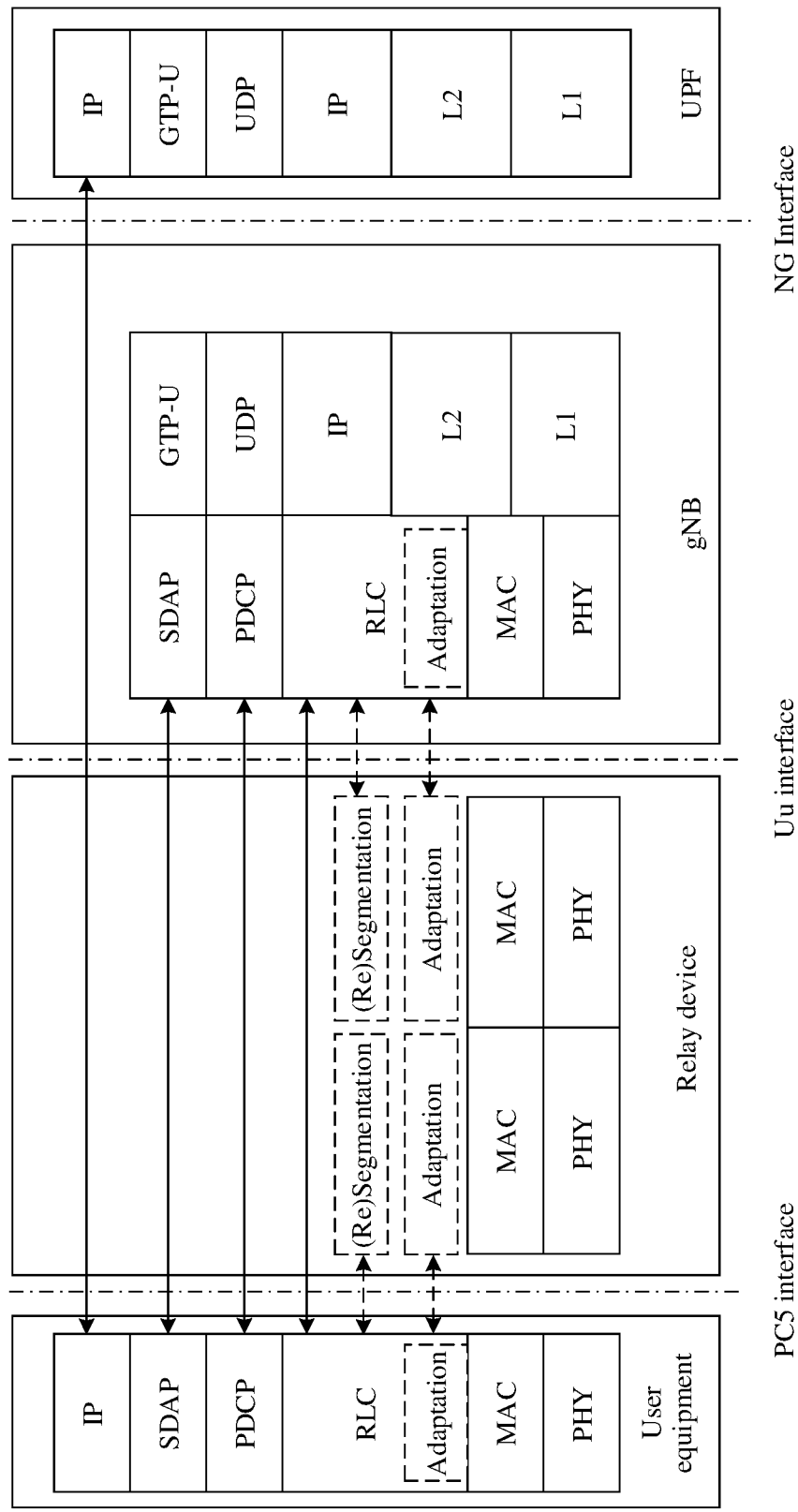
FIG. 2 is a schematic diagram of a user plane communication protocol stack of a relay communication system according to an embodiment of this application.

FIG. 2 is a schematic diagram of user plane protocol stack communication in a relay communication system according to this application. As shown in FIG. 2, a network device system may include a base station (for example, a gNB) and a user plane function (UPF). A protocol stack of the UPF may include a complete protocol stack, including, for example, a layer 1 (L1), a layer 2 (L2), an Internet protocol (IP) layer, a user datagram protocol (UDP) layer, and a general packet radio service tunneling protocol user plane (GTP-U) layer, where L1 and L2 may refer to protocol stack layers in a wired transmission network (where for example, wired transmission is performed through an optical fiber). For example, L1 may be a physical layer, and L2 may be a data link layer.

As shown in FIG. 2, a protocol stack that is in the gNB and that corresponds to the UPF may include an L1, an L2, an IP layer, a UDP layer, and a GTP-U layer. A protocol stack that is in the gNB and that corresponds to a relay device or user equipment may include a service data adaptation protocol (SDAP) layer, a packet data convergence (PDCP) layer, a media access control (MAC) layer, and a physical (PHY) layer. Optionally, the protocol stack further includes an adaptation layer (Adapt layer).

As shown in FIG. 2, a protocol stack that is in the relay device and that corresponds to the gNB or the user equipment may include a MAC layer and a PHY layer. Optionally, the protocol stack may further include an Adapt layer. Optionally, the protocol stack may further include a segmentation function or a resegmentation function of an RLC layer. Optionally, the protocol stack that is in the relay device and that corresponds to the user equipment or the gNB includes a function of reading RLC layer header information of the RLC layer.

Alternatively, as shown in FIG. 2, the protocol stack that is in the relay device and that corresponds to the gNB or the user equipment consists of the PHY layer and the MAC layer. Alternatively, the protocol stack that is in the relay device and that corresponds to the gNB or the user equipment consists of the PHY layer, the MAC layer, and the adaptation layer. The protocol stack that is in the relay device and that corresponds to the gNB or the user equipment consists of the PHY layer, the MAC layer, and the segmentation function or the resegmentation function of the RLC layer. The protocol stack that is in the relay device and that corresponds to the user equipment or the gNB consists of the PHY layer, the MAC layer, and the function of reading RLC layer header information of the RLC layer. Alternatively, the protocol stack that is in the relay device and that corresponds to the gNB or the user equipment consists of the PHY layer, the MAC layer, the adaptation layer, and the segmentation function or the resegmentation function of the RLC layer. Alternatively, the protocol stack that is in the relay device and that corresponds to the gNB or the user equipment consists of the PHY layer, the MAC layer, the adaptation layer, and the function of reading RLC layer header information of the RLC layer. Alternatively, the protocol stack that is in the relay device and that corresponds to the user equipment or the gNB consists of the PHY layer, the MAC layer, the segmentation function or the resegmentation function of the RLC layer, and the function of reading RLC layer header information of the RLC layer. Alternatively, the protocol stack that is in the relay device and that corresponds to the user equipment or the gNB consists of the PHY layer, the MAC layer, the adaptation layer, the segmentation function or the resegmentation function of the RLC layer, and the function of reading RLC layer header information of the RLC layer.

Alternatively, as shown in FIG. 2, the protocol stack that is in the relay device and that corresponds to the gNB or the user equipment does not include an IP layer, an SDAP layer, or a PDCP layer. Optionally, the protocol stack does not include functions other than the segmentation function or the resegmentation function of the RLC layer either. Optionally, the protocol stack that is in the relay device and that corresponds to the user equipment or the gNB does not include the function of reading RLC layer header information of the RLC layer either.

As shown in FIG. 2, the user equipment may include a complete protocol stack, including, for example, a PHY layer, a MAC layer, an RLC layer, a PDCP layer, an SDAP layer, and an IP layer. Optionally, the protocol stack may further include an Adapt layer.

In this application, in the protocol stack in the user equipment, the relay device, or a Uu interface of the network device, generally, a layer 1 is a PHY layer, a layer 2 is a MAC layer, an RLC layer, an Adapt layer, or a PDCP layer, and a layer 3 is generally an RRC layer, a NAS stratum, or an IP layer. In this application, a bearer may include one or more of a radio bearer (RB), an RLC bearer, or a MAC bearer. The RB may include a signaling radio bearer (SRB) and a data radio bearer (DRB). The SRB may include a PDCP layer and/or a channel between the PDCP layer and an RLC layer. The DRB may include an RRC layer and/or a channel between the RRC layer and the RLC layer. The RLC bearer may include an RLC layer and/or a logical channel between the RLC layer and a MAC layer. The MAC bearer may include the MAC layer and/or a transport channel between the MAC layer and a PHY layer. The bearer may be identified by using a bearer identifier. The bearer identifier may include one or more of a signaling radio bearer identity (SRB ID), a data radio bearer identity (DRB ID), a logical channel identifier (LCID), or a quality of service flow (QoS flow) identifier. The bearer may be identified by using a bearer index. The bearer index may include one or more of a signaling radio bearer index, a data radio bearer index, or a logical channel identifier (LCID) index. A bearer identifier of a PDCP bearer may be the DRB ID or the SRB ID. A bearer identifier of the RLC bearer may be the LCID.

In this application, the bearer identifier is used as an example, and the "bearer identifier" in this application may also be replaced with a "bearer index". The bearer identifier in this application is usually used for bearer mapping.

In this application, the foregoing listed protocol layers may exist at a same protocol layer, or may exist at different protocol layers. The Adapt layer in this application may be a sublayer at the RLC layer, or a function name at the RLC layer; may be a sublayer at the MAC layer, or may be a function name at the MAC layer; or may be a separate layer located between the MAC layer and the RLC layer. It should be understood that, if the Adapt layer is the sublayer at the RLC layer, or is the function name at the RLC layer, in some embodiments of this application, a process of processing data at the Adapt layer may be considered as a process of processing the data at the RLC layer. If the Adapt layer is the sublayer at the MAC layer, or is the function name at the MAC layer, in some embodiments of this application, a process of processing data at the Adapt layer may be considered as a process of processing the data at the MAC layer. For descriptions of functions of each protocol stack layer, refer to a related standard protocol text TS 36.300v15.8.0 or TS 38.300v15.8.0 of the 3rd Generation Partnership Project (3GPP).

Figure 3:
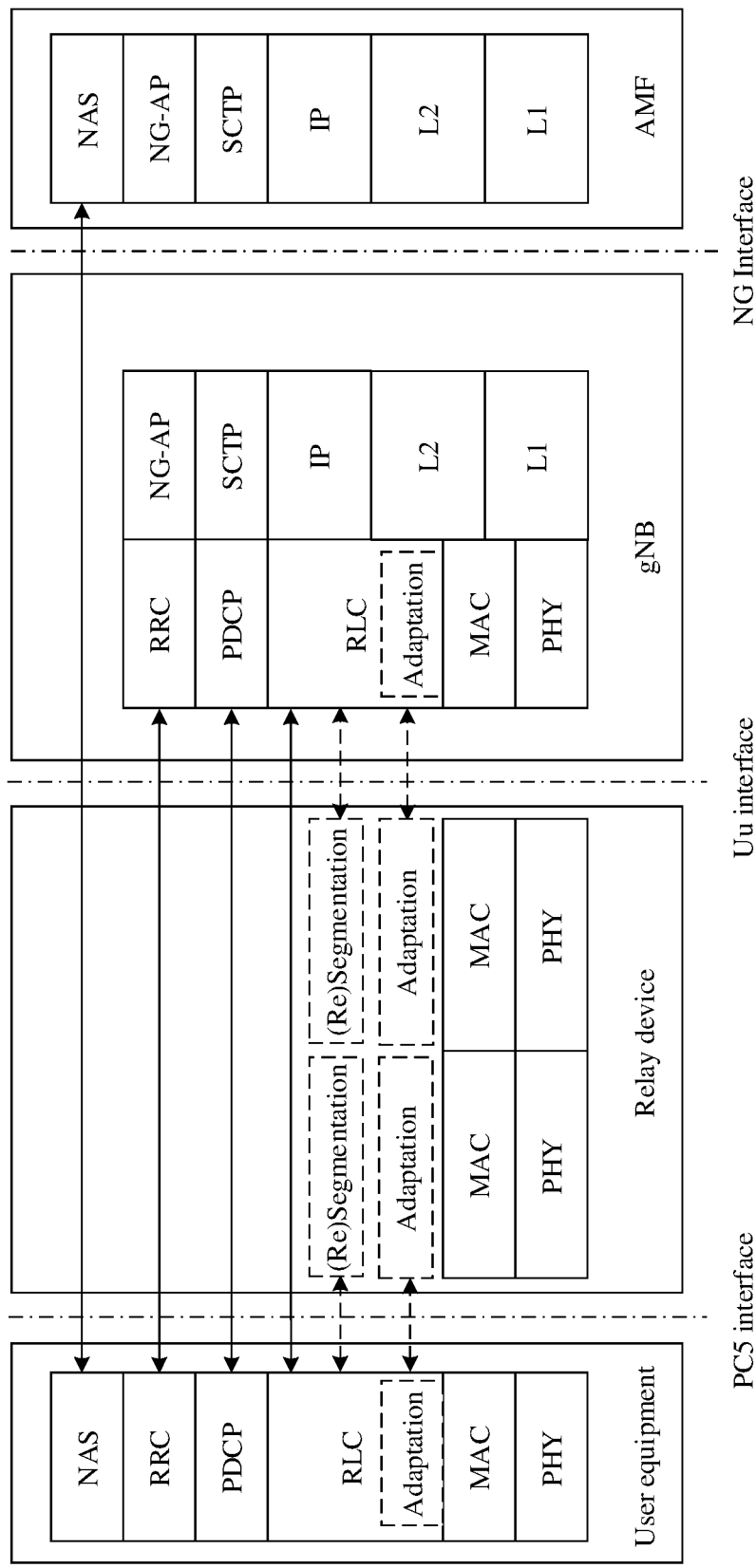
FIG. 3 is a schematic diagram of a control plane communication protocol stack of a relay communication system according to an embodiment of this application.

FIG. 3 is a schematic diagram of control plane protocol stack communication in a relay communication system according to this application. As shown in FIG. 3, the communication system may include a base station (for example, a gNB) and an access and mobility management function (AMF) network element. A protocol stack of the AMF may include an L1 layer, an L2 layer, an IP layer, a stream control transmission protocol (SCTP) layer, a next generation application protocol (NG-AP) layer, and a non-access stratum (NAS). A protocol stack that is in the gNB and that corresponds to the AMF may include an L1 layer, an L2 layer, an IP layer, an SCTP layer, and an NG-AP layer.

A protocol stack that is in the gNB and that corresponds to a relay device or user equipment may include a PHY layer, a MAC layer, an RLC layer, a PDCP layer, and an RRC layer. Optionally, the protocol stack that is in the gNB and that corresponds to a relay device or user equipment may include an Adapt layer.

As shown in FIG. 3, a protocol stack that is in the relay device and that corresponds to the gNB or the user equipment may include a PHY layer and a MAC layer, and optionally, an Adapt layer. Optionally, the protocol stack may further include a segmentation function or a resegmentation function of an RLC layer. Optionally, the protocol stack that is in the relay device and that corresponds to the user equipment or the gNB includes a function of reading RLC layer header information of the RLC layer.

Alternatively, as shown in FIG. 3, the protocol stack that is in the relay device and that corresponds to the gNB or the user equipment consists of the PHY layer and the MAC layer. Alternatively, the protocol stack that is in the relay device and that corresponds to the gNB or the user equipment consists of the PHY layer, the MAC layer, and the adaptation layer. The protocol stack that is in the relay device and that corresponds to the gNB or the user equipment consists of the PHY layer, the MAC layer, and the segmentation function or the resegmentation function of the RLC layer. The protocol stack that is in the relay device and that corresponds to the user equipment or the gNB consists of the PHY layer, the MAC layer, and the function of reading RLC layer header information of the RLC layer. Alternatively, the protocol stack that is in the relay device and that corresponds to the gNB or the user equipment consists of the PHY layer, the MAC layer, the adaptation layer, and the segmentation function or the resegmentation function of the RLC layer. Alternatively, the protocol stack that is in the relay device and that corresponds to the gNB or the user equipment consists of the PHY layer, the MAC layer, the adaptation layer, and the function of reading RLC layer header information of the RLC layer. Alternatively, the protocol stack that is in the relay device and that corresponds to the user equipment or the gNB consists of the PHY layer, the MAC layer, the segmentation function or the resegmentation function of the RLC layer, and the function of reading RLC layer header information of the RLC layer. Alternatively, the protocol stack that is in the relay device and that corresponds to the user equipment or the gNB consists of the PHY layer, the MAC layer, the adaptation layer, the segmentation function or the resegmentation function of the RLC layer, and the function of reading RLC layer header information of the RLC layer.

Alternatively, as shown in FIG. 3, the protocol stack that is in the relay device and that corresponds to the gNB or the user equipment does not include an RRC layer or a PDCP layer. Optionally, the protocol stack does not include functions other than the segmentation function or the resegmentation function of the RLC layer either. Optionally, the protocol stack that is in the relay device and that corresponds to the user equipment or the gNB does not include the function of reading RLC layer header information of the RLC layer either.

As shown in FIG. 3, a protocol stack of the user equipment may include a PHY layer, a MAC layer, an RLC layer, a PDCP layer, an RRC layer, and a NAS stratum. Optionally, the protocol stack may further include an Adapt layer.

In FIG. 2 and FIG. 3, in an example of downlink data transmission, a protocol stack that is in the relay device and that corresponds to the gNB may include an Adapt layer, and does not include a segmentation function or a resegmentation function of an RLC layer, and a protocol stack that is in the relay device and that corresponds to the user equipment may include a segmentation function or a resegmentation function of an RLC layer, and does not include an Adapt layer. In an example of uplink data transmission, a protocol stack that is in the relay device and that corresponds to the gNB may include a segmentation function or a resegmentation function of an RLC layer, and does not include an Adapt layer, and a protocol stack that is in the relay device and that corresponds to the user equipment may include an Adapt layer, and does not include a segmentation function or a resegmentation function of an RLC layer.

Figure 4:
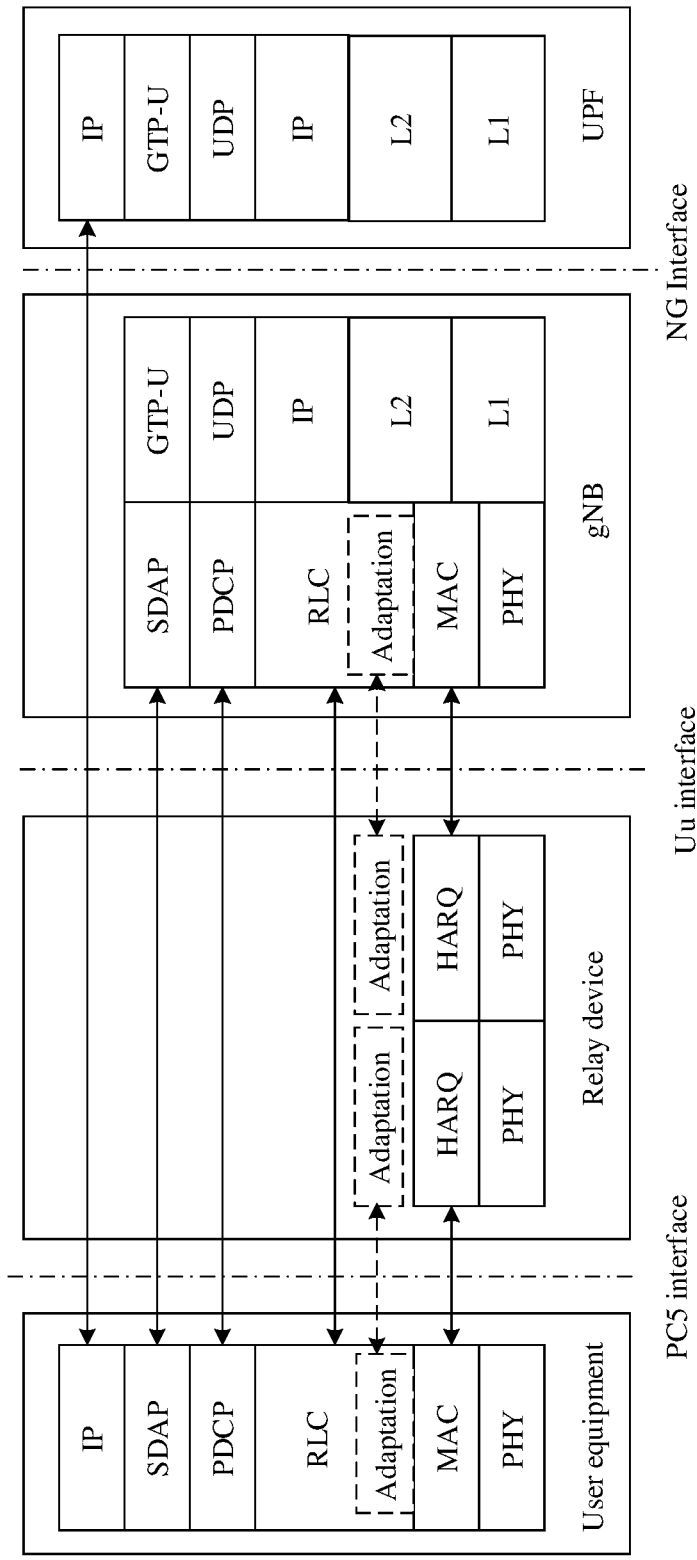
FIG. 4 is a schematic diagram of a user plane communication protocol stack of a relay communication system according to an embodiment of this application.

FIG. 4 is a schematic diagram of user plane protocol stack communication in a relay communication system according to this application. As shown in FIG. 4, the communication system may include a base station (for example, a gNB) and an access and a UPF network element. A protocol stack that is in the UPF may include an L1 layer, an L2 layer, an IP layer, a UDP layer, and a GTP-U layer. A protocol stack that is in the gNB and that corresponds to the UPF may include an L1 layer, an L2 layer, an IP layer, a UDP layer, and a GTP-U layer.

A protocol stack that is in the gNB and that corresponds to a relay device or user equipment may include a PHY layer, a MAC layer, an RLC layer, a PDCP layer, and an SDAP layer. Optionally, the protocol stack may further include an Adapt layer.

As shown in FIG. 4, a protocol stack that is in the relay device and that corresponds to the gNB or the user equipment may include a PHY layer and a hybrid automatic repeat request (hybrid automatic repeat request, HARQ) function, and optionally, may further include an adaptation layer. Optionally, the protocol stack further includes a function of reading MAC layer header information of the MAC layer.

Alternatively, as shown in FIG. 4, the protocol stack that is in the relay device and that corresponds to the gNB or the user equipment consists of the PHY layer and the HARQ function of the MAC layer. Alternatively, the protocol stack that is in the relay device and that corresponds to the gNB or the user equipment consists of the PHY layer, the HARQ function of the MAC layer, and the adaptation layer. The protocol stack that is in the relay device and that corresponds to the user equipment or the gNB consists of the PHY layer, the HARQ function of the MAC layer, and the function of reading MAC layer header information of the MAC layer. Alternatively, the protocol stack that is in the relay device and that corresponds to the gNB or the user equipment consists of the PHY layer, the HARQ function of the MAC layer, the adaptation layer, and the function of reading MAC layer header information of the MAC layer.

Alternatively, as shown in FIG. 4, a protocol stack that is in the relay device and that corresponds to the gNB does not include an IP layer, an SDAP layer, a PDCP layer, an RLC layer, or functions other than a HARQ function of a MAC layer. A protocol stack that is in the relay device and that corresponds to the user equipment does not include an IP layer, an SDAP layer, a PDCP layer, an RLC layer, or functions other than a HARQ function of a MAC layer. Optionally, the protocol stack that is in the relay device and that corresponds to the user equipment or the gNB does not include the function of reading MAC layer header information of the MAC layer either.

As shown in FIG. 4, the user equipment may include a PHY layer, a MAC layer, an RLC layer, a PDCP layer, an SDAP layer, and an IP layer. Optionally, the user equipment may further include an Adapt layer.

Figure 5:
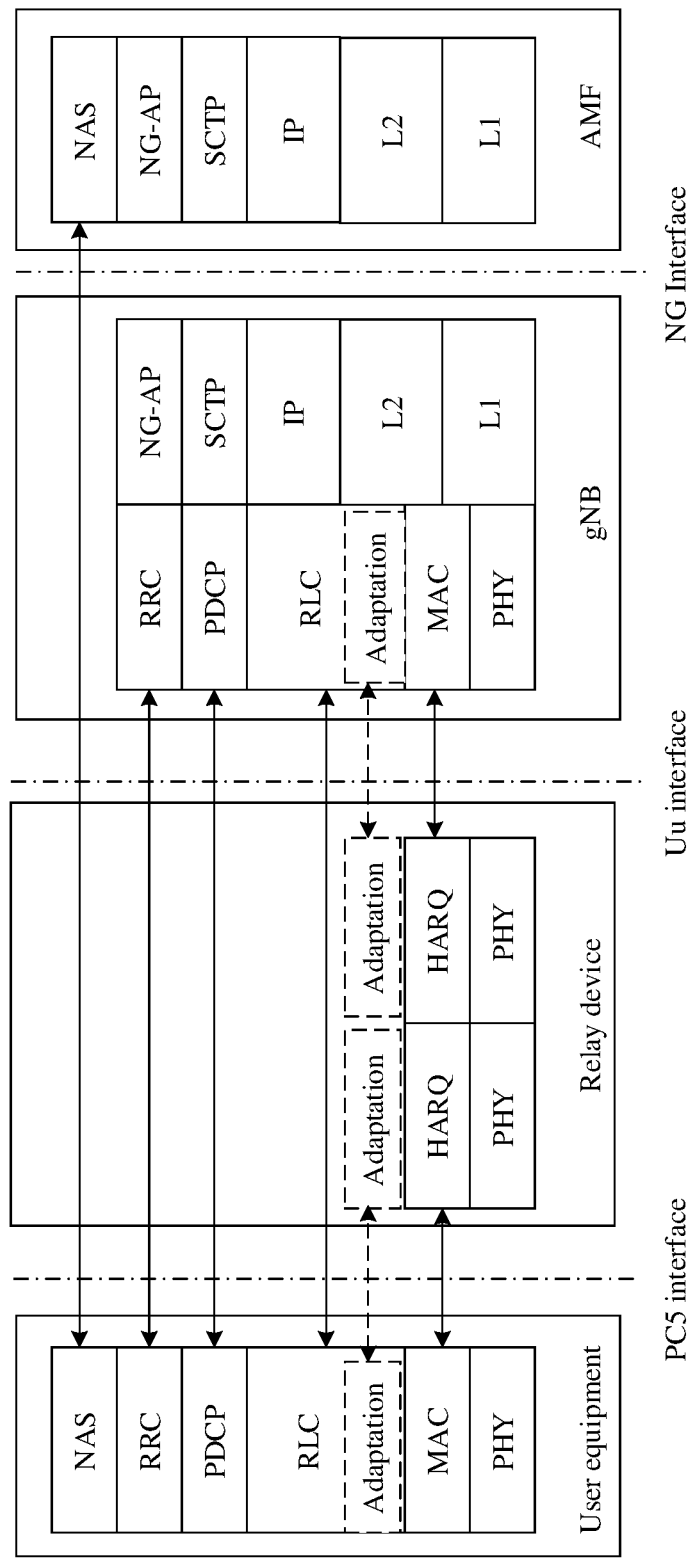
FIG. 5 is a schematic diagram of a control plane communication protocol stack of a relay communication system according to an embodiment of this application.

FIG. 5 is a schematic diagram of control plane protocol stack communication in a communication system according to this application. As shown in FIG. 5, the communication system may include a base station (for example, a gNB) and an access and an AMF network element. A protocol stack that is in the AMF may include an L1 layer, an L2 layer, an IP layer, an SCTP layer, an NG-AP layer and a NAS stratum. A protocol stack that is in the gNB and that corresponds to a UPF may include an L1 layer, an L2 layer, an IP layer, an SCTP layer, and an NG-AP layer.

A protocol stack that is in the gNB and that corresponds to a relay device or user equipment may include a PHY layer, a MAC layer, an RLC layer, a PDCP layer, and an RRC layer. Optionally, the protocol stack may further include an Adapt layer.

As shown in FIG. 5, a protocol stack that is in the relay device and that corresponds to the gNB or the user equipment may include a PHY layer and a HARQ function of a MAC layer. Optionally, the protocol stack may further include an adaptation layer. Optionally, the protocol stack that is in the relay device and that corresponds to the user equipment or the gNB includes a function of reading MAC layer header information of the MAC layer.

Alternatively, as shown in FIG. 5, the protocol stack that is in the relay device and that corresponds to the gNB or the user equipment consists of the PHY layer and the HARQ function of the MAC layer. Alternatively, the protocol stack that is in the relay device and that corresponds to the gNB or the user equipment consists of the PHY layer, the HARQ function of the MAC layer, and the adaptation layer. The protocol stack that is in the relay device and that corresponds to the user equipment or the gNB consists of the PHY layer, the HARQ function of the MAC layer, and the function of reading MAC layer header information of the MAC layer. Alternatively, the protocol stack that is in the relay device and that corresponds to the gNB or the user equipment consists of the PHY layer, the HARQ function of the MAC layer, the adaptation layer, and the function of reading MAC layer header information of the MAC layer.

Alternatively, as shown in FIG. 5, a protocol stack that is in the relay device and that corresponds to the gNB does not include an RRC layer, a PDCP layer, an RLC layer, or functions other than a HARQ function of a MAC layer. A protocol stack that is in the relay device and that corresponds to the user equipment does not include an RRC layer, a PDCP layer, an RLC layer, or functions other than a HARQ function of a MAC layer. Optionally, the protocol stack that is in the relay device and that corresponds to the user equipment or the gNB does not include the function of reading MAC layer header information of the MAC layer either.

As shown in FIG. 5, the user equipment may include a PHY layer, a MAC layer, an RLC layer, a PDCP layer, an RRC layer, and a NAS stratum. Optionally, the user equipment may further include an Adapt layer.

Figure 6:
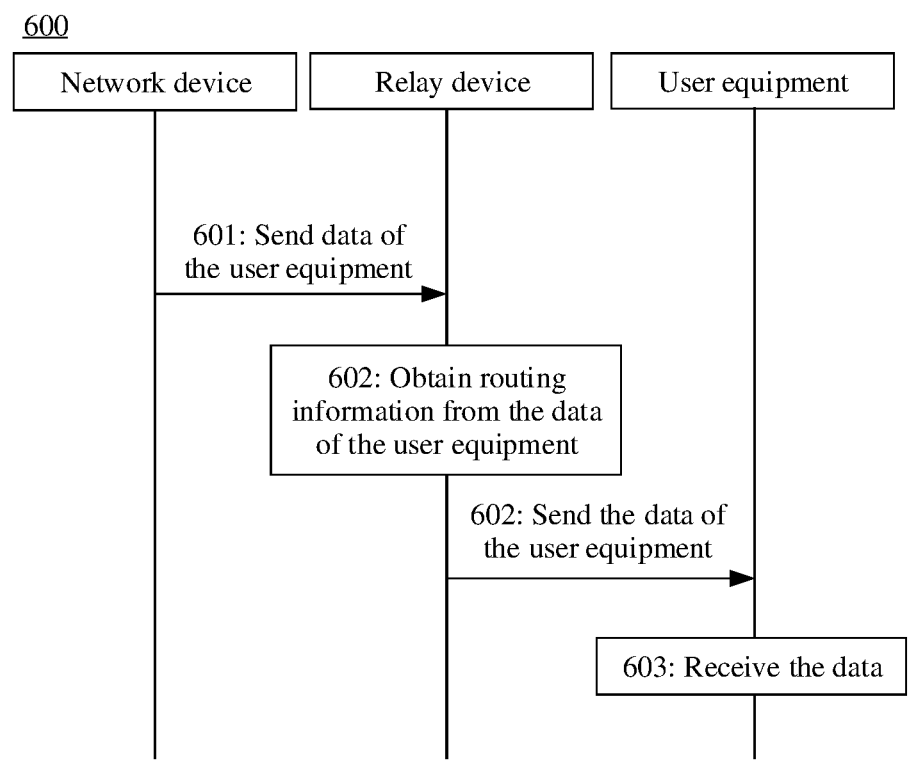
FIG. 6 is a schematic flowchart of a relay communication method according to an embodiment of this application.

In FIG. 4 and FIG. 5, in an example of downlink data transmission, the protocol stack that is in the relay device and that corresponds to the gNB may include an Adapt layer, and the protocol stack that is in the relay device and that corresponds to the user equipment may not include an Adapt layer. In an example of uplink data transmission, the protocol stack that is in the relay device and that corresponds to the gNB may not include an Adapt layer, and the protocol stack that is in the relay device and that corresponds to the user equipment may include an Adapt layer. FIG. 6 is a communication method according to an embodiment of this application. Downlink data transmission on a user plane is used as an example. The communication method 600 includes the following operations.

Operation 601: A network device sends data of user equipment to a relay device.

The network device sends the data to the relay device through a first link. The first link is a wireless communication link between the network device and the relay device. The wireless communication link may be a downlink.

The data may include a routing information bearer identifier. The routing information bearer identifier may be included in a MAC layer header, an RLC layer header, an adaptation layer header, a PDCP layer header, or a data payload of the data. The routing information in this application is used to determine information about the user equipment, information about a next relay device, or information about the network device. The routing information may include at least one of a user equipment identifier, a relay device identifier, a transmission path identifier, or a network device identifier.

Operation 602: The relay device obtains the routing information from the data of the user equipment.

The relay device receives the data of the user equipment. The relay device obtains the routing information bearer identifier from the data of the user equipment. The relay device processes the data of the user equipment based on the routing information bearer identifier from the data of the user equipment. The relay device may determine, based on the routing information, user equipment to which the data of the user equipment needs to be sent. The relay device sends the data of the user equipment to the user equipment.

Operation 603: The user equipment receives the data of the user equipment.

After the user equipment receives the data of the user equipment from the relay device, if detecting that the user equipment has previously received the same data of the user equipment from another relay device, the user equipment may discard the data of the user equipment or perform combination. For a specific method, refer to the method 800.

Uplink data packet transmission on a user plane and downlink data packet transmission on a user plane are processes mutually reverse to each other. For the uplink data packet transmission on a user plane, refer to a downlink data packet communication method on a user plane, where the uplink data packet transmission on a user plane may specifically include the following operations.

User equipment sends data of a network device to a relay device. The data may include routing information. After the relay device receives the data of the user equipment, the relay device obtains the routing information from the data of the user equipment. The relay device may determine, based on the routing information, a network device to which the data of the user equipment needs to be sent. The relay device sends the data of the network device to the network device. After the network device receives the data, if detecting that the network device has previously received the same data of the user equipment from another relay device, the network device may discard the data of the user equipment or perform combination. For a specific method, refer to the method 800.

For a data communication method on a control plane, refer to a data communication method on a user plane. Details are not described herein again.

In addition, when a bearer granularity is used in relay communication, the data that is sent to the user equipment by the network device may include a bearer identifier, or the data that is sent to the network device by the user equipment may include a bearer identifier. For a specific method, refer to the method 800. Details are not described herein.

An embodiment of this application provides a relay communication method. According to the relay communication method in this embodiment of this application, a relay device may forward, based on routing information, data of user equipment from a network device or data of a network device from user equipment. In addition, the routing information is carried in a MAC layer header, an RLC layer header, an adaptation layer header, a PDCP layer header, or a data payload of the data of the user equipment from the network device or the data of the network device from the user equipment, so that layer 2 relay can be implemented. An IP layer may not be used for relay. For example, an IP address does not need to be used to route and identify the data of the user equipment, so that a protocol stack of the relay device can be simplified, and a transmission latency of the data packet can be reduced. In addition, with reference to the method 800, a bearer identifier is carried in the data, so that relay communication in a bearer granularity can be implemented.

Figure 7:
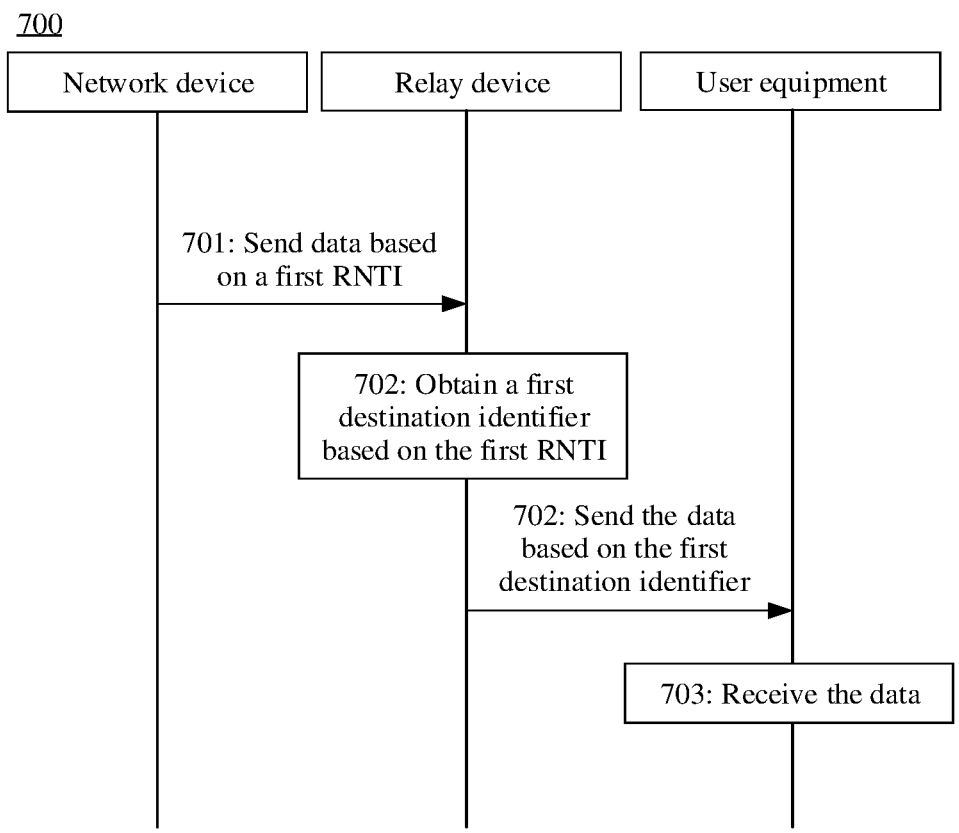
FIG. 7 is a schematic flowchart of relay communication of data according to an embodiment of this application.

FIG. 7 is a schematic flowchart of the relay communication method according to this application. The following specifically describes a technical solution in this embodiment of this application with reference to FIG. 8. Downlink data packet transmission on a user plane is used as an example. The communication method 800 corresponding to FIG. 8 may include the following operations.

Operation 701: A network device sends data to a relay device based on a first radio network temporary identifier (RNTI).

The first RNTI may be an identifier that is dedicated to communication between the network device and user equipment via the relay device. The first RNTI may be a group radio network temporary identifier (G-RNTI) or a cell radio network temporary identifier (C-RNTI). For example, if the network device sends the data to the user equipment via a plurality of relay devices, the first RNTI may be a G-RNTI. In this way, the network device may multicast the data of the user equipment to the plurality of relay devices. Therefore, a beneficial effect of saving RNTI resources or saving power of a base station can be achieved. For example, if the network device sends the data to the user equipment via a plurality of relay devices, the first RNTI may be a C-RNTI. In this way, the network device may separately unicast the data of the user equipment to the plurality of relay devices. Therefore, the network device can flexibly select a quantity of relay devices serving the user equipment.

The network device may allocate the first RNTI to the relay device by using dedicated signaling or based on system information, for example, based on an RRC message, or based on a message in a process of establishing an RRC connection between the network device and the relay device.

The network device may send data to the relay device through a first link, where the data is scrambled and modulated by using the first RNTI. The first link is a wireless communication link between the network device and the relay device. The wireless communication link may be a downlink.

Operation 702: The relay device receives the data from the network device based on the first RNTI, to obtain a first destination identifier.

The relay device descrambles or demodulates the data based on the first RNTI. When the relay device receives the data from the network device, the relay device may attempt to demodulate or descramble the data by using different RNTIs. The relay device determines the first RNTI, where the first RNTI is an RNTI based on which the data can be successfully demodulated or descrambled.

The relay device obtains the first destination identifier based on the first RNTI. The first destination identifier may be a destination identifier of the user equipment. For example, the first destination identifier may be a destination layer 1 identifier or a destination layer 2 identifier. For example, the destination layer 2 identifier (destination L2 ID) may be carried in a MAC header, an RLC header, an Adapt header, or a PDCP header of sidelink data, where the destination layer 2 identifier may be used to identify user equipment used as a receive end. The destination layer 1 identifier (destination L1 ID) may be carried in sidelink control information (SCI). Alternatively, the destination layer 2 identifier in this application may be a destination layer 2 identifier corresponding to multicast. To be specific, one destination layer 2 identifier may be used to identify a plurality of pieces of user equipment or one user equipment group, indicating that communication on the SL is multicast communication, and one relay device serves the plurality of pieces of user equipment or the user equipment group. For the destination layer 2 identifier or the destination layer 1 identifier in this application, refer to a definition of the destination layer 2 identifier or the destination layer 1 identifier in a V2X-related standard protocol text in the 3GPP standard protocol text.

For example, the relay device may determine the first destination identifier based on a correspondence between the first RNTI and the first destination identifier.

For example, a correspondence between an RNTI and a destination identifier may be obtained according to the following method: The relay device receives a message from the network device, where the message includes an RNTI and a destination identifier, and there is a correspondence between the RNTI and the destination identifier. Optionally, the correspondence between an RNTI and a destination identifier may be obtained according to the following method: The relay device receives a first message from the network device, where the first message includes an RNTI. The relay device receives a second message from the network device, where the second message includes a destination identifier. The relay device obtains the correspondence between the RNTI and the destination identifier based on the first message and the second message. For example, the message may be an RRC message, a system information broadcast (SIB) message, or a system information block (SIB). For example, the message may be an RRC connection reconfiguration message, or the message may be a message in the process of establishing the RRC connection between the network device and the relay device.

The correspondence may be a one-to-one correspondence, a one-to-many correspondence, or a many-to-one correspondence. For example, the relay device may receive a correspondence table as shown in Table 1.

TABLE 1

| RNTI | Destination identifier |
|---|---|
| RNTI 1 | Destination identifier 1 |
| RNTI 2 | Destination identifier 2 |
| . . . | . . . |
| RNTI 3 | Destination identifier 3 |

Table 1 is merely an example of a correspondence table. Values shown in a column of the RNTI may include a value of the RNTI or an index value of the RNTI. Values shown in a column of the destination identifier may include a value of the destination identifier or an index value of the destination identifier. The two columns of the RNTI and the destination identifier may be two information elements in one message, or may be two information elements in two messages. An implementation of the correspondence table 1 is not limited in this application.

Optionally, when a network is available to the relay device, the network device may preconfigure the correspondence between an RNTI and a destination identifier in the relay device.

Optionally, a device vendor may store the correspondence between an RNTI and a destination identifier in the relay device before the relay device is delivered from a factory. In this way, the network device does not need to exchange the correspondence between an RNTI and a destination identifier with the relay device, thereby reducing signaling overheads.

The relay device sends the data of the user equipment to the user equipment based on the first destination identifier.

The relay device sends the data to the user equipment through a second link. The second link is a wireless direct communication link between the relay device and the user equipment. The wireless direct communication link may be a sidelink.

When the first destination identifier is the destination layer 1 identifier of the user equipment, the relay device may include the first destination identifier in the sidelink control information (SCI), and then sends the SCI and the data of the user equipment to the user equipment. When the first destination identifier is the destination layer 2 identifier of the user equipment, the relay device may include the first destination identifier in a MAC header, an RLC header, an Adapt header, or a PDCP header of the data of the user equipment, and then sends the data of the user equipment to the user equipment.

Operation 703: The user equipment receives the data of the user equipment.

After the user equipment receives the data of the user equipment from the relay device, if detecting that the user equipment has previously received the same data of the user equipment from another relay device, the user equipment may discard the data of the user equipment. For a specific method, refer to the method 800.

Uplink data packet transmission on a user plane and downlink data packet transmission on a user plane are processes mutually reverse to each other. For the uplink data packet transmission on a user plane, refer to a downlink data packet communication method on a user plane, where the uplink data packet transmission on a user plane may specifically include the following operations.

User equipment sends data to a relay device based on a first destination identifier. The relay device receives the data from the user equipment based on the first destination identifier. The relay device may obtain a first RNTI based on a correspondence between the first destination identifier and an RNTI. The relay device sends the data to the network device based on the first RNTI. After the network device receives the data, if detecting that the network device has previously received the same data of the user equipment from another relay device, the network device may discard the data of the user equipment or perform combination. For a specific method, refer to the method 800.

For a data communication method on a control plane, refer to a data communication method on a user plane. Details are not described herein again. A protocol stack of the relay device in this embodiment may be any protocol stack of the relay device in FIG. 2 to FIG. 5. Details are not described herein again. The communication method provided in this embodiment may be combined with the method 600 to form a new embodiment. In addition, when a bearer granularity is used in relay communication, the data that is sent to the user equipment by the network device may include a bearer identifier, or the data that is sent to the network device by the user equipment may include a bearer identifier. For a specific method, refer to the method 800. Details are not described herein.

An embodiment of this application provides a relay communication method. A relay device may forward data based on a correspondence between identifiers configured by a network device. In addition, by using a multicast identifier G-RNTI, RNTI resources and power of a base station can be saved when a plurality of relay devices serve one piece of user equipment. In addition, with reference to the method 800, a bearer identifier is carried in the data, so that relay communication in a bearer granularity can be implemented.

Figure 8:
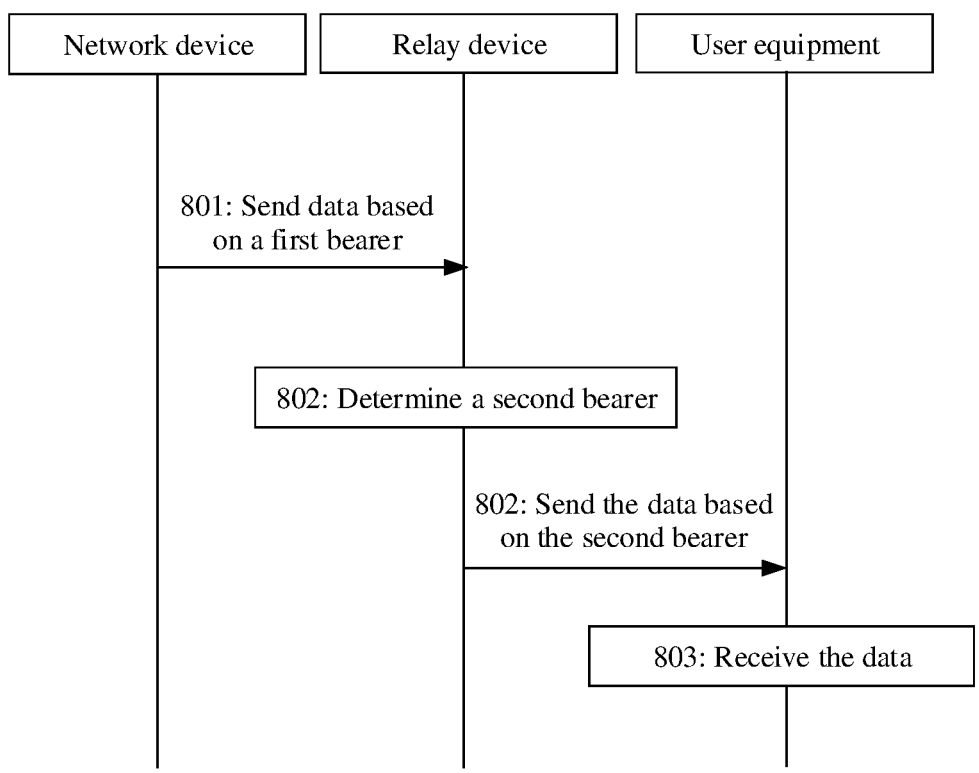
FIG. 8 is a schematic flowchart of relay communication of data according to an embodiment of this application.
Figure 9A:
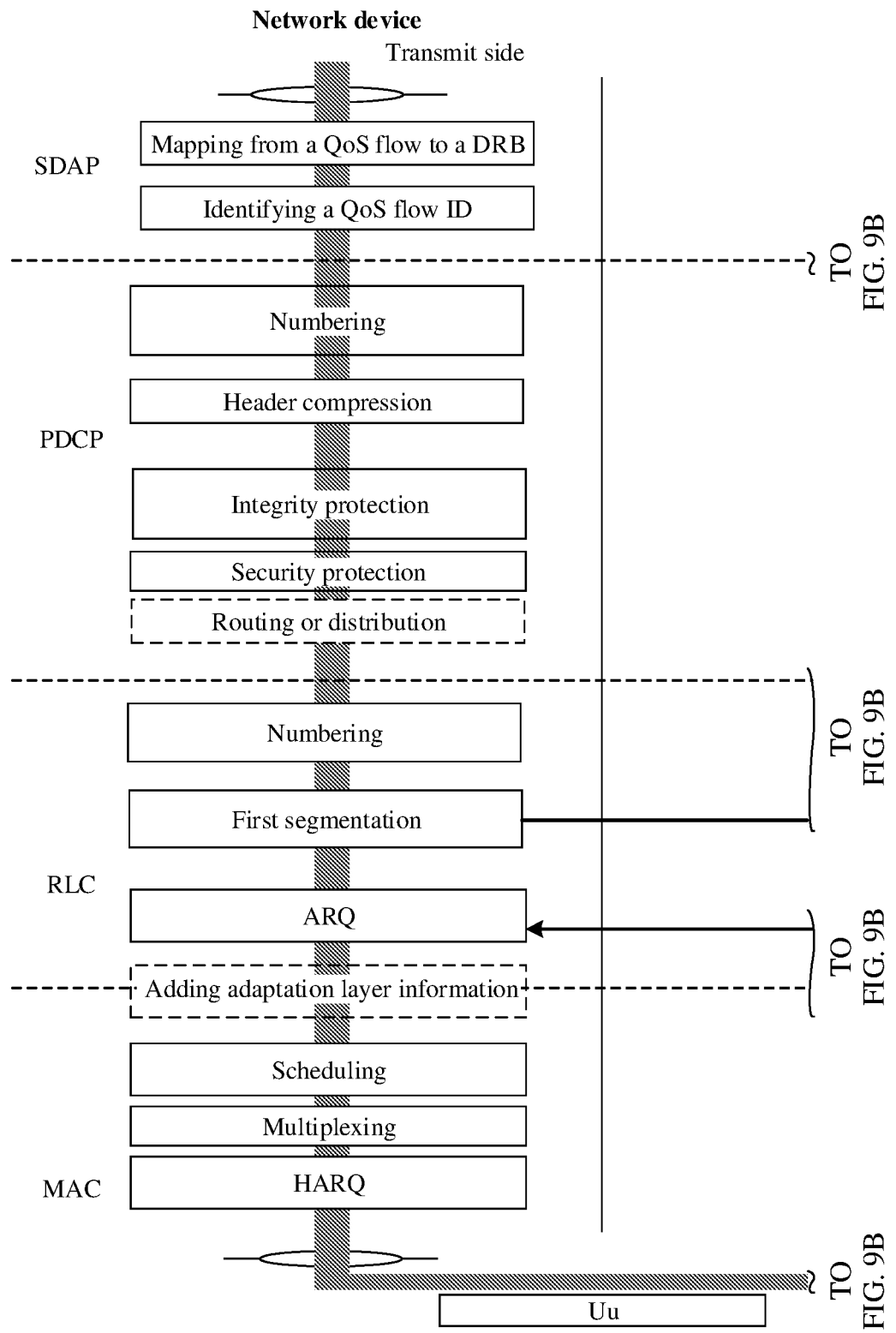
FIG. 9A to FIG. 9C are a schematic flowchart of a relay communication method according to an embodiment of this application.
Figure 9B:
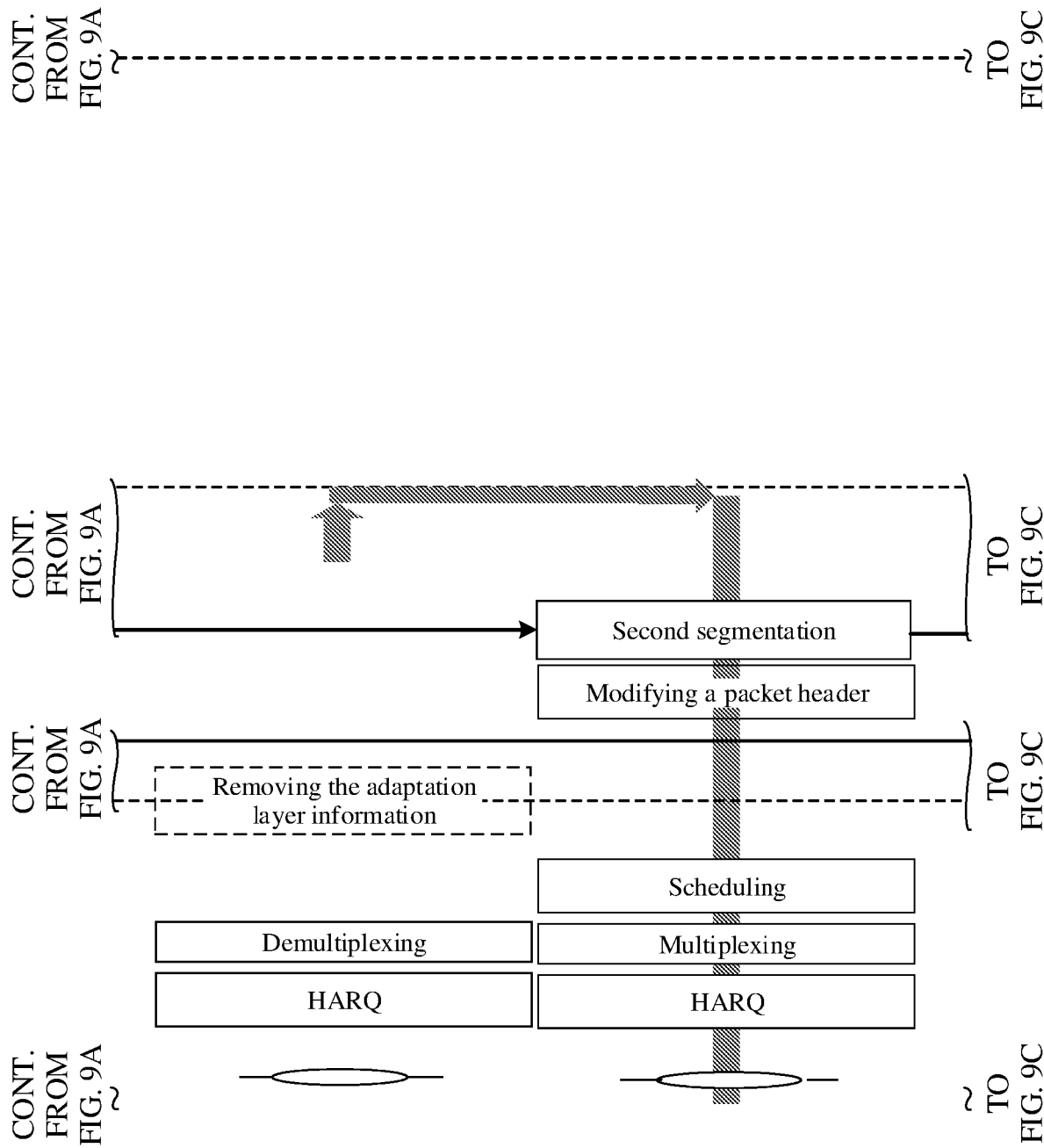
Figure 9C:
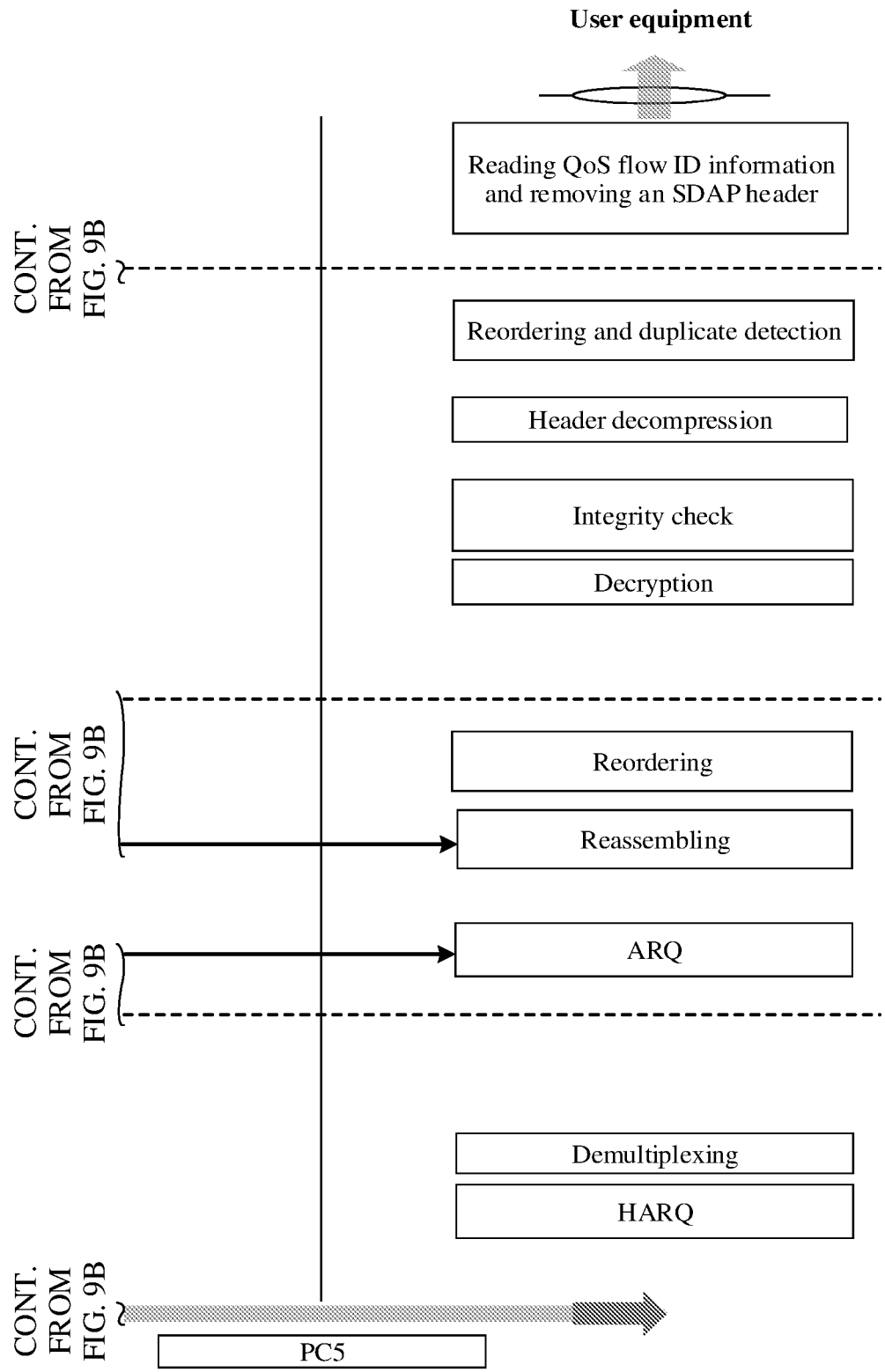
Figure 10A:
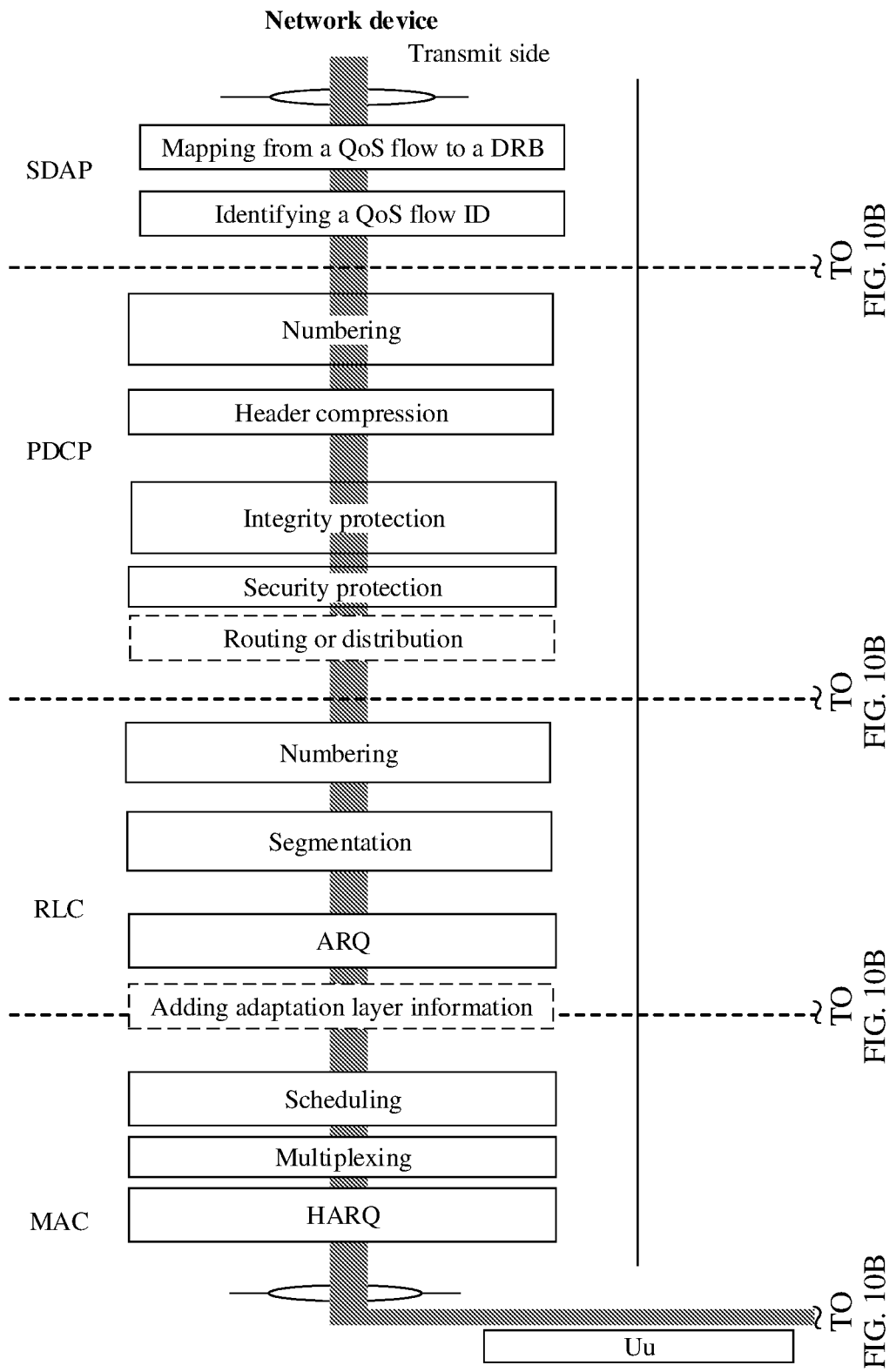
FIG. 10A to FIG. 10C are a schematic flowchart of a relay communication method according to an embodiment of this application.
Figure 10B:
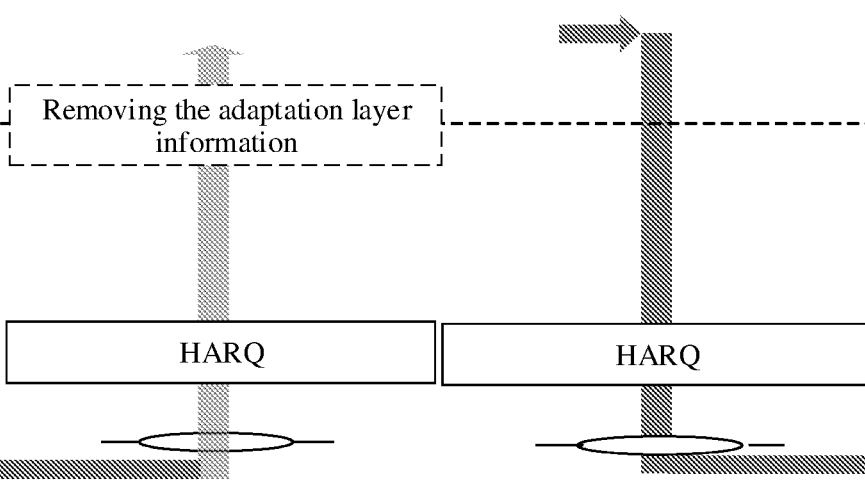
Figure 10C:
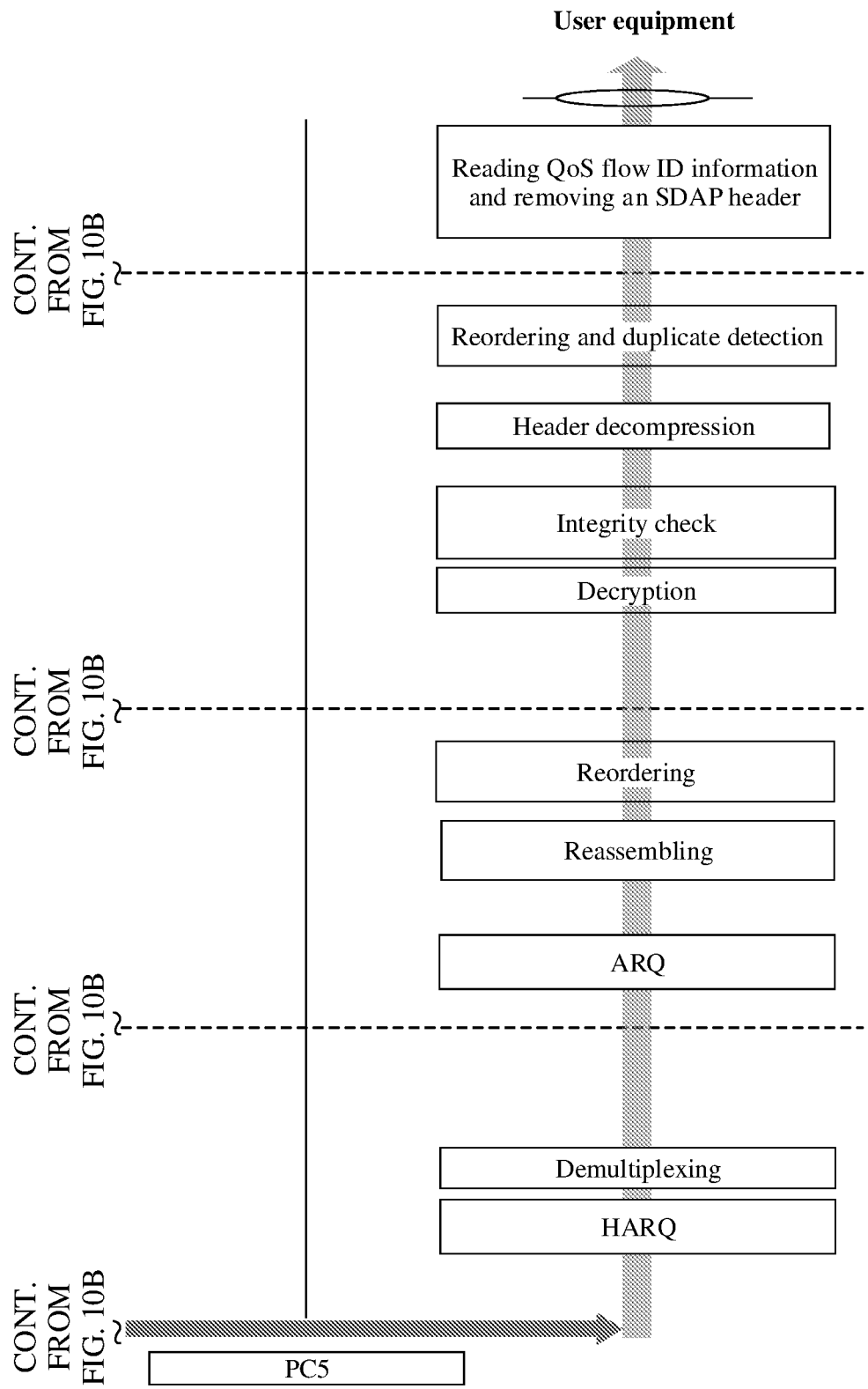

FIG. 8 is a schematic flowchart of the relay communication method according to this application. The method is applicable to a scenario of relay communication in a bearer granularity. The following specifically describes a technical solution in this embodiment of this application with reference to FIG. 8. Downlink data packet transmission on a user plane is used as an example. The communication method 800 corresponding to FIG. 8 may include the following operations.

Operation 801: A network device sends data of user equipment to a relay device based on a first bearer.

The network device maps the data of the user equipment to the first bearer and sends the data to the relay device. The network device carries a first bearer identifier in the data. Optionally, the network device may carry a second bearer identifier in the data. The first bearer identifier and/or the second bearer identifier may be included in a data packet header (for example, a MAC layer header, an RLC layer header, an adaptation layer header, or a PDCP layer header) or a data payload of the data. The first bearer may be a Uu interface bearer. The second bearer may be a PC5 interface bearer or a sidelink bearer.

In a scenario in which a plurality of relay devices serve the same user equipment, the data of the user equipment sent by the network device to the plurality of relay devices may carry a same first bearer identifier and/or a same second bearer identifier, for example, a same LCID.

Operation 802: The relay device determines a second bearer and sends the data to the user equipment through the second bearer.

The relay device receives the data of the user equipment from the network device. The relay device maps the data to the second bearer and sends the data to the user equipment. The relay device carries the second bearer identifier in the data. Optionally, the relay device may carry the first bearer identifier in the data. For example, if a correspondence between an RLC entity and a PDCP entity on a user equipment side is preconfigured, the first bearer identifier may not be carried. For example, the first bearer identifier and/or the second bearer identifier may be included in the data packet header (for example, a MAC layer header, an RLC layer header, an adaptation layer header, or a PDCP layer header) or the data payload (payload) of the data.

Optionally, the data of the user equipment that is received by the relay device from the network device includes the second bearer identifier, and the relay device obtains the second bearer from the data.

Optionally, the data of the user equipment that is received by the relay device from the network device includes the first bearer identifier, and the relay device may obtain the second bearer based on a correspondence between a first bearer and a second bearer.

For example, a correspondence between a Uu interface bearer identifier and a PC5 interface bearer identifier may be obtained according to the following method: The relay device receives a message from the network device, where the message includes a Uu interface bearer identifier and a PC5 interface bearer identifier, and there is a correspondence between the Uu interface bearer identifier and the PC5 interface bearer identifier. Optionally, the correspondence between a Uu interface bearer identifier and a PC5 interface bearer identifier may be obtained according to the following method: The relay device receives a first message from the network device, where the first message includes a Uu interface bearer identifier. The relay device receives a second message from the network device, where the second message includes a PC5 interface bearer identifier. The relay device obtains a correspondence between the Uu interface bearer identifier and the PC5 interface bearer identifier based on the first message and the second message. For example, the message may be an RRC message, a system information broadcast (SIB) message, or a system information block (system information block, SIB). For example, the message may be an RRC connection reconfiguration message, or the message may be a message in a process of establishing an RRC connection between the network device and the relay device.

The correspondence may be a one-to-one correspondence, a one-to-many correspondence, or a many-to-one correspondence. For example, the relay device may receive a correspondence table as shown in Table 2.

TABLE 2

| Uu interface bearer identifier | PC5 interface bearer identifier |
| --- | --- |
| Bearer ID 1 | Bearer ID 1 |
| Bearer ID 2 | Bearer ID 2 |
| . . . | . . . |
| Bearer ID 3 | Bearer ID 3 |

Table 2 is merely an example of a correspondence table. Values in a column of the Uu interface bearer identifier may include a value of the Uu interface bearer identifier or an index value of the Uu interface bearer identifier. Values in a column of the PC5 interface bearer identifier may include a value of the PC5 interface bearer identifier or an index value of the PC5 interface bearer identifier. The two columns of the Uu interface bearer identifier and the PC5 interface bearer identifier may be two information elements in one message, or may be two information elements in two messages. An implementation of the correspondence table 2 is not limited in this application.

In the scenario in which the plurality of relay devices serve the same user equipment, different first bearer identifiers may correspond to a same second bearer identifier. For example, values in the column of the PC5 interface bearer identifier shown in Table 2 may be the same.

Optionally, when a network is available to the relay device, the network device may preconfigure the correspondence between a Uu interface bearer identifier and a PC5 interface bearer identifier in the relay device.

Optionally, a device vendor may store the correspondence between a Uu interface bearer identifier and a PC5 interface bearer identifier in the relay device before the relay device is delivered from a factory. In this way, the network device does not need to exchange the correspondence between a Uu interface bearer identifier and a PC5 interface bearer identifier with the relay device, thereby reducing signaling overheads.

Operation 803: The user equipment receives the data of the user equipment.

The user equipment receives the data of the user equipment by using the second bearer based on the second bearer identifier included in the data. Optionally, after the user equipment receives the data of the user equipment by using the second bearer, the user equipment processes the data based on the first bearer identifier included in the data.

For example, the user equipment may deliver, based on a first bearer identifier (for example, a DRB ID) in an RLC subheader of the data of the user equipment, data received by an RLC layer to an upper layer (for example, a PDCP layer) of the RLC layer. Alternatively, if the correspondence between an RLC entity and a PDCP entity on a user equipment side is preconfigured, the user equipment may deliver, based on a second bearer identifier (for example, an LCID) in a MAC header of the data of the user equipment, the data of the user equipment received by a MAC layer to an upper layer (for example, an RLC layer) of the MAC layer. The RLC layer delivers the received data to a preconfigured PDCP layer.

For example, when a protocol stack of a second link includes an adaptation layer, the user equipment may deliver, based on a first bearer identifier (for example, a DRB ID) in an adaptation layer header of the data of the user equipment, data received by the adaptation layer to an upper layer (for example, a PDCP layer) of the adaptation layer. Alternatively, if a correspondence between an Adapt entity and a PDCP entity on a user equipment side is preconfigured, the user equipment may deliver, based on a second bearer identifier in an RLC header of the data of the user equipment, the data of the user equipment received by an RLC layer to an Adapt layer. The Adapt layer delivers the received data to a preconfigured PDCP layer. Alternatively, if a correspondence between an RLC entity, an Adapt entity, and a PDCP layer on a user equipment side is preconfigured, the user equipment may deliver, based on a second bearer identifier (for example, an LCID) in a MAC header of the data of the user equipment, the data of the user equipment received by a MAC layer to an RLC layer. The RLC layer delivers the received data to a preconfigured Adapt layer. The Adapt layer delivers the received data to a preconfigured PDCP layer.

The user equipment may deliver, to a same upper layer based on a preconfigured correspondence between a second bearer identifier and an upper layer of the second bearer, all data received through different second bearers. For example, in the scenario in which the plurality of relay devices serve the same user equipment, the user equipment may receive data via different relay devices, and therefore, the user equipment may receive the data through a plurality of second bearers. For example, if the second bearer is an RLC bearer, the second bearer identifier may be an LCID. Data received by the user equipment through the RLC bearer may be an RLC service data unit (SDU) or a PDCP protocol data unit (PDU). The user equipment may deliver, to a same PDCP layer based on a preconfigured correspondence between an LCID and a PDCP layer, all data received through different RLC bearers. Optionally, the PDCP layer of the user equipment may perform duplicate detection based on a PDCP SN number carried in the data. If PDCP serial numbers (SNs) carried in data from different relay devices are the same, the PDCP layer of the user equipment may choose to retain only one piece of the data. The PDCP layer of the user equipment may discard other pieces of duplicate data. Alternatively, the PDCP layer of the user equipment combines a plurality of pieces of the data. If PDCP serial numbers (SNs) carried in the data from different relay devices are different, the PDCP layer of the user equipment may deliver the data to the upper layer in a sequence of the PDCP SN numbers. Uplink data packet transmission on a user plane and downlink data packet transmission on a user plane are processes mutually reverse to each other. For the uplink data packet transmission on a user plane, refer to a downlink data packet communication method on a user plane, where the uplink data packet transmission on a user plane may specifically include the following operations.

User equipment sends data to a relay device based on a second bearer. The user equipment carries a second bearer identifier in the data. Optionally, the user equipment may carry the second bearer identifier in the data. Optionally, the data that is received by the relay device from the user equipment includes the first bearer identifier, and the relay device obtains a first bearer from the data. Optionally, the data that is received by the relay device from the user equipment includes the second bearer identifier, and the relay device may obtain a first bearer based on a correspondence between the second bearer and the first bearer. The relay device sends the data to the network device through the first bearer. After the network device receives the data, if detecting that the network device has previously received the same data of the user equipment from another relay device, the network device may discard the data of the user equipment or perform combination.

For a data communication method on a control plane, refer to a data communication method on a user plane. Details are not described herein again.

Embodiments of this application provide a relay communication method. Optionally, the data of the user equipment that is received by the relay device from the network device includes the second bearer identifier, and the relay device obtains the second bearer from the data. In this way, the correspondence between the first bearer and the second bearer identifier does not need to be configured, thereby reducing control signaling overheads. Optionally, the data of the user equipment that is received by the relay device from the network device includes the first bearer identifier, and the relay device may obtain the second bearer based on the correspondence between the first bearer and the second bearer. In this way, the second bearer identifier does not need to be carried, thereby reducing data information overheads. The user equipment may deliver, to a same upper layer based on a preconfigured correspondence between a second bearer identifier and an upper layer of the second bearer, all data received through different second bearers. In this way, the second bearers selected by the plurality of relay devices serving the same user equipment do not need to be the same. In this way, the plurality of relay devices serving the same user equipment may select the second bearers more flexibly. The plurality of relay devices serve the same user equipment, so that relay communication stability can be improved. The user equipment may perform duplicate detection of a plurality of pieces of data from different relay devices based on serial numbers of protocol stack entities. In this way, storage space of the user equipment can be saved.

The method 800 according to this embodiment of this application may be combined with the method 600 and/or the method 700, to form a new embodiment. A protocol stack of any relay communication systems in the method 600 to the method 800 in embodiments of this application may be any protocol stack shown in FIG. 2 to FIG. 5. Specific examples are used for description.

With reference to FIG. 2 and FIG. 9A to FIG. 9C, in an example of downlink data packet transmission on a user plane, a network device receives data of user equipment from a core network element. The network device processes the data of the user equipment at an SDAP layer. The processing may include adding a QoS flow ID and performing mapping from a QoS flow to a Uu interface DRB. Further, the network device processes the data of the user equipment at a PDCP layer. The processing may include adding a packet sequence number, performing header compression, performing security-related protection, or the like. The network device processes the data of the user equipment at an RLC layer. The processing may include performing packet segmentation and adding a sequence number. Optionally, the network device processes the data of the user equipment at an adaptation layer. The processing may include adding routing information and/or a bearer identifier to an adaptation layer header of the data of the user equipment. Optionally, the bearer identifier includes a Uu interface DRB ID. The network device processes the data of the user equipment at a MAC layer. The processing may include performing scheduling, multiplexing, or a HARQ. Optionally, if the network device does not have the adaptation layer, or the network device does not process the data of the user equipment at the adaptation layer, the processing performed by the network device on the data of the user equipment at the MAC layer may include adding the routing information and/or the bearer identifier to a MAC layer header of the data. Further, the network device then processes the data of the user equipment at a PHY layer. Finally, the network device sends the data of the user equipment to a relay device. Optionally, the network device may send the data of the user equipment to the relay device based on a first RNTI. The relay device receives the data of the user equipment, and a PHY layer of the relay device processes the data of the user equipment. Optionally, the relay device may receive the data of the user equipment by using the first RNTI. A MAC layer of the relay device processes the data of the user equipment. The processing may include performing a HARQ or demultiplexing. Optionally, the processing performed by the relay device on the data of the user equipment at the MAC layer may include reading the routing information and/or the bearer identifier in the MAC header of the data of the user equipment. Optionally, an adaptation layer of the relay device processes the data of the user equipment. The processing may include reading the routing information and/or the bearer identifier in the adaptation layer header of the data of the user equipment. The relay device may further remove the adaptation layer header of the data of the user equipment. The relay device processes the data of the user equipment based on the obtained routing information and/or the obtained bearer identifier. The relay device may determine, based on the routing information, user equipment to which the data of the user equipment needs to be sent. The relay device may determine, based on the bearer identifier, a PC5 interface bearer to which the data of the user equipment is mapped. The relay device may perform segmentation or resegmentation on the data of the user equipment at an RLC layer on a transmit side, and modify or add a corresponding RLC header. For example, the relay device may determine a policy of performing segmentation or resegmentation on the data of the user equipment. For example, the relay device may determine, based on a transport block size (transport block size, TBS) and a size of the data of the user equipment, the policy of performing segmentation or resegmentation on the data of the user equipment. Further, the relay device processes the data of the user equipment at the MAC layer. The processing may include performing scheduling, multiplexing, or a HARQ. Further, the relay device processes the data of the user equipment at the PHY layer. Finally, the relay device sends the data of the user equipment to the user equipment through a sidelink. Optionally, the relay device may obtain a first destination identifier based on the first RNTI, and send the data of the user equipment to the user equipment based on the first destination identifier. Optionally, the relay device may send the data of the user equipment to the user equipment through the PC5 interface bearer. The user equipment receives the data through the PC5 interface bearer. Optionally, the data includes the Uu interface DRB ID. The user equipment delivers the data to a PDCP layer corresponding to the DRB ID. Optionally, the user equipment may perform duplicate detection and combination on data from a plurality of relay devices based on PDCP SN numbers or RLC SN numbers carried in the data.

With reference to FIG. 2 and FIG. 9A to FIG. 9C, in an example of uplink data packet transmission on a user plane, user equipment receives a data packet of an IP layer. The user equipment processes the data at an SDAP layer. The processing may include adding a QoS flow ID and performing mapping from a QoS flow to a PC5 interface DRB. Further, the user equipment processes the data at a PDCP layer. The processing may include adding a packet sequence number, performing header compression, performing security-related protection, or the like. The user equipment processes the data at an RLC layer. The processing may include performing packet segmentation and adding a sequence number. Optionally, the user equipment processes the data at an adaptation layer. The processing may include adding routing information and/or a bearer identifier to an adaptation layer header of the data. The user equipment processes the data at a MAC layer. The processing may include performing scheduling, multiplexing, or a HARQ. Optionally, if the user equipment does not have the adaptation layer, or the user equipment does not process the data at the adaptation layer, the processing performed by the network device on the data at the MAC layer may include adding the routing information and/or the bearer identifier to a MAC layer header of the data. Optionally, the bearer identifier includes a Uu interface DRB ID. Further, the user equipment then processes the data at a PHY layer. Finally, the user equipment sends the data to a relay device through a sidelink. Optionally, the user equipment may send the data of the user equipment to the relay device based on a first destination identifier. The relay device receives the data of the user equipment, and a PHY layer of the relay device processes the data of the user equipment. Optionally, the relay device may receive the data of the user equipment by using the first destination identifier. A MAC layer of the relay device processes the data of the user equipment. The processing may include performing a HARQ or demultiplexing. Optionally, the processing performed by the relay device on the data of the user equipment at the MAC layer may include reading the routing information and/or the bearer identifier in the MAC header of the data of the user equipment. Optionally, an adaptation layer of the relay device processes the data of the user equipment. The processing may include reading the routing information and/or the bearer identifier in the adaptation layer header of the data of the user equipment. The relay device may further remove the adaptation layer header of the data of the user equipment.

The relay device processes the data of the user equipment based on the obtained routing information and/or the obtained bearer identifier. The relay device may determine, based on the routing information, a network device to which the data of the user equipment needs to be sent. The relay device may determine, based on the bearer identifier, a Uu interface bearer to which the data of the user equipment is mapped. The relay device may perform segmentation or resegmentation on the data of the user equipment at an RLC layer on a transmit side, and modify or add a corresponding RLC header. For example, the relay device may determine a policy of performing segmentation or resegmentation on the data of the user equipment. For example, the relay device may determine, based on a transport block size (transport block size, TBS) and a size of the data of the user equipment, the policy of performing segmentation or resegmentation on the data of the user equipment. Further, the relay device processes the data of the user equipment at the MAC layer. The processing may include performing scheduling, multiplexing, or a HARQ. Further, the relay device processes the data of the user equipment at the PHY layer. Finally, the relay device sends the data of the user equipment to the network device through a Uu interface. Optionally, the relay device may obtain a first RNTI based on the first destination identifier, and send the data of the user equipment to the network device based on the first RNTI. Optionally, the relay device may send the data of the user equipment to the network device through the Uu interface bearer. Optionally, the data includes the Uu interface DRB ID. The network device delivers the data to a PDCP layer corresponding to the DRB ID. Optionally, the network device may perform duplicate detection and combination on data from a plurality of relay devices based on PDCP SN numbers or RLC SN numbers carried in the data.

With reference to FIG. 4 and FIG. 10A to FIG. 10C, in an example of downlink data packet transmission on a user plane, a network device receives data of user equipment from a core network element. The network device processes the data of the user equipment at an SDAP layer. The processing may include adding a QoS flow ID and performing mapping from a QoS flow to a Uu interface DRB. Further, the network device processes the data of the user equipment at a PDCP layer. The processing may include adding a packet sequence number, performing header compression, performing security-related protection, or the like. The network device processes the data of the user equipment at an RLC layer. The processing may include performing packet segmentation and adding a sequence number. Optionally, the network device processes the data of the user equipment at an adaptation layer. The processing may include adding routing information and/or a bearer identifier to an adaptation layer header of the data of the user equipment. Optionally, the bearer identifier includes a Uu interface DRB ID. The network device processes the data of the user equipment at a MAC layer. The processing may include scheduling and multiplexing. Optionally, if the network device does not have the adaptation layer, or the network device does not process the data of the user equipment at the adaptation layer, the processing performed by the network device on the data of the user equipment at the MAC layer may include adding the routing information and/or the bearer identifier to a MAC layer header of the data of the user equipment. Further, the network device then processes the data of the user equipment at a PHY layer. Finally, the network device sends the data of the user equipment to a relay device. Optionally, the network device may send the data of the user equipment to the relay device based on a first RNTI. The relay device receives the data of the user equipment, and a PHY layer of the relay device processes the data of the user equipment. Optionally, the relay device may receive the data of the user equipment by using the first RNTI. A MAC layer of the relay device processes the data of the user equipment. The processing may include performing a HARQ feedback. Optionally, the processing performed by the relay device on the data of the user equipment at the MAC layer may include reading the routing information and/or the bearer identifier in the MAC header of the data of the user equipment. Optionally, an adaptation layer of the relay device processes the data of the user equipment. The processing may include reading the routing information and/or the bearer identifier in the adaptation layer header of the data of the user equipment. The relay device may further remove the adaptation layer header of the data of the user equipment. The relay device processes the data of the user equipment based on the obtained routing information and/or the obtained bearer identifier. The relay device may determine, based on the routing information, user equipment to which the data of the user equipment needs to be sent. The relay device may determine, based on the bearer identifier, a PC5 interface bearer to which the data of the user equipment is mapped. The relay device processes the data of the user equipment at a MAC layer on a transmit side of the relay device. The processing may include performing a HARQ feedback. Further, the relay device processes the data of the user equipment at the PHY layer. Finally, the relay device sends the data of the user equipment to the user equipment through a sidelink. Optionally, the relay device may obtain a first destination identifier based on the first RNTI, and send the data of the user equipment to the user equipment based on the first destination identifier. Optionally, the relay device may send the data of the user equipment to the user equipment through the PC5 interface bearer. Optionally, the data includes the Uu interface DRB ID. The user equipment delivers the data to a PDCP layer corresponding to the DRB ID. Optionally, the user equipment may perform duplicate detection and combination on data from a plurality of relay devices based on PDCP SN numbers, RLC SN numbers, or MAC SN numbers carried in the data.

With reference to FIG. 4 and FIG. 10A to FIG. 10C, in an example of uplink data packet transmission on a user plane, user equipment receives a data packet of an IP layer. The user equipment processes data at an SDAP layer. The processing may include adding a QoS flow ID and performing mapping from a QoS flow to a PC5 interface DRB. Further, the user equipment processes the data at a PDCP layer. The processing may include adding a packet sequence number, performing header compression, performing security-related protection, or the like. The user equipment processes the data at an RLC layer. The processing may include performing packet segmentation and adding a sequence number. Optionally, the user equipment processes the data at an adaptation layer. The processing may include adding routing information and/or a bearer identifier to an adaptation layer header of the data. Optionally, the bearer identifier includes a Uu interface DRB ID. The user equipment processes the data at a MAC layer. The processing may include scheduling and multiplexing. Optionally, if the user equipment does not have the adaptation layer, or the user equipment does not process the data at the adaptation layer, the processing performed by the network device on the data at the MAC layer may include adding the routing information and/or the bearer identifier to a MAC layer header of the data. Further, the user equipment then processes the data at a PHY layer. Finally, the user equipment sends the data to a relay device through a sidelink. Optionally, the user equipment may send the data of the user equipment to the relay device based on a first destination identifier. The relay device receives the data of the user equipment, and a PHY layer of the relay device processes the data of the user equipment. Optionally, the relay device may receive the data of the user equipment by using the first destination identifier. A MAC layer of the relay device processes the data of the user equipment. The processing may include performing a HARQ feedback. Optionally, the processing performed by the relay device on the data of the user equipment at the MAC layer may include reading the routing information and/or the bearer identifier in the MAC header of the data of the user equipment. Optionally, an adaptation layer of the relay device processes the data of the user equipment. The processing may include reading the routing information and/or the bearer identifier in the adaptation layer header of the data of the user equipment. The relay device may further remove the adaptation layer header of the data of the user equipment. The relay device processes the data of the user equipment based on the obtained routing information and/or the obtained bearer identifier. The relay device may determine, based on the routing information, a network device to which the data of the user equipment needs to be sent. The relay device may determine, based on the bearer identifier, a Uu interface bearer to which the data of the user equipment is mapped. The relay device processes the data of the user equipment at a MAC layer on a transmit side of the relay device. The processing may include performing a HARQ feedback. Further, the relay device processes the data of the user equipment at the PHY layer. Optionally, the relay device may obtain a first RNTI based on the first destination identifier, and send the data of the user equipment to the network device based on the first RNTI. Optionally, the relay device may send the data of the user equipment to the network device through the Uu interface bearer. Optionally, the data includes the Uu interface DRB ID. The network device delivers the data to a PDCP layer corresponding to the DRB ID. Optionally, the network device may perform duplicate detection and combination on data from a plurality of relay devices based on PDCP SN numbers, RLC SN numbers, or MAC SN numbers carried in the data.

Based on a technical conception similar to the foregoing technical conception, embodiments of this application provide a communication device. The communication device may be the relay device, the network device, or the user equipment in the communication method and any possible designs of the communication method provided in any one of the foregoing embodiments. The relay device, the network device, or the user equipment may include at least one corresponding unit configured to perform a method step, an operation, or behavior of the method performed by the relay device, the network device, or the user equipment according to the communication method provided in any one of the foregoing embodiments. Settings of the at least one unit may be in one-to-one correspondence with method steps, operations, or behavior performed by the relay device, the network device, or the user equipment.

Figure 11:
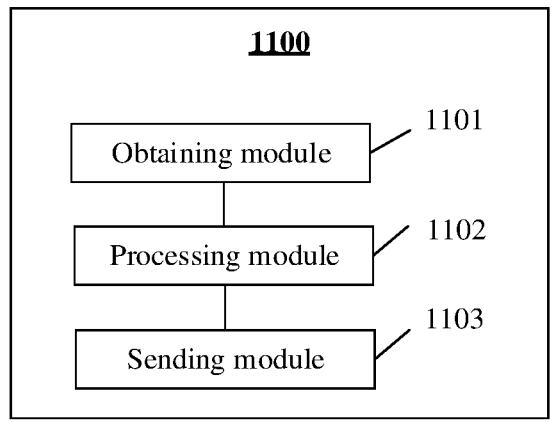
FIG. 11 is a schematic block diagram of a relay device according to an embodiment of this application.

FIG. 11 is a schematic block diagram of a relay device 1100 according to an embodiment of this application. The following specifically describes a structure and a function of the relay device 1100 with reference to FIG. 11. For example, this application provides the relay device 1100. The relay device 1100 may include: an obtaining module 1101, configured to receive a data packet from a network device through a first link; and a sending module 1103, configured to send the data packet to user equipment through a second link. A protocol stack of the relay device 1100 consists of a physical layer, a media access control layer, and a segmentation function or a resegmentation function of a radio link control layer; a protocol stack of the relay device consists of a physical layer, a media access control layer, a segmentation function or a resegmentation function of a radio link control layer, and an adaptation layer; a protocol stack of the relay device consists of a physical layer and a hybrid automatic repeat request function of a media access control layer; or a protocol stack of the relay device consists of a physical layer, a hybrid automatic repeat request function of a media access control layer, and an adaptation layer. The first link is a wireless communication link between the network device and the relay device, and the second link is a wireless direct communication link between the relay device and the user equipment.

Optionally, the obtaining module 1101 is specifically configured to receive the data from the network device based on a first multicast radio network temporary identifier through the first link. The relay device 1100 further includes a processing module 1102, configured to obtain a first destination layer 2 identifier based on the first multicast radio network temporary identifier, where there is a correspondence between the first multicast radio network temporary identifier and the first destination layer 2 identifier. The sending module 1103 is specifically configured to send the data to the user equipment based on the first destination layer 2 identifier through the second link.

Optionally, the obtaining module 1101 receives the first multicast radio network temporary identifier and the first destination layer 2 identifier from the network device, where there is the correspondence between the first multicast radio network temporary identifier and the first destination layer 2 identifier.

Optionally, the first destination layer 2 identifier is included in a media access control layer header of the data, and the first destination layer 2 identifier is used to identify the user equipment.

Optionally, the data from the network device that is obtained by the obtaining module 1101 includes a first bearer identifier and/or a second bearer identifier.

Optionally, the data sent by the sending module 1103 to the user equipment includes the first bearer identifier. The first bearer identifier is used by the user equipment to map the data of the user equipment to a first bearer.

Optionally, the bearer includes one or more of a signaling radio bearer, a data radio bearer, a radio link control bearer, or a media access control bearer.

Optionally, the first bearer identifier and/or the second bearer identifier are/is included in an adaptation layer header, a radio link control layer header, or a media access control layer header of the data.

Optionally, the obtaining module 1101 is further configured to receive the data from the network device through the first bearer; the processing module 1102 is further configured to determine the second bearer identifier based on the first bearer identifier, where there is a correspondence between the first bearer identifier and the second bearer identifier; and the sending module 1103 is further configured to send the data to the user equipment based on the second bearer identifier.

Optionally, the obtaining module 1101 may receive the first multicast radio network temporary identifier and the first destination layer 2 identifier from the network device based on a radio resource control message or a system information broadcast message, where there is the correspondence between the first multicast radio network temporary identifier and the first destination layer 2 identifier.

Figure 12:
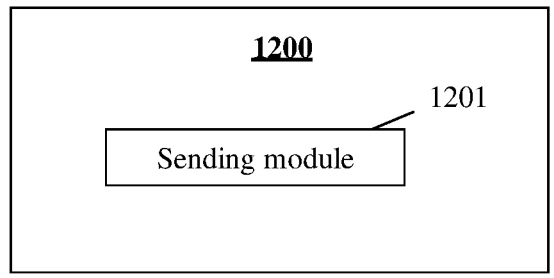
FIG. 12 is a schematic block diagram of a network device according to an embodiment of this application.

FIG. 12 is a schematic block diagram of a network device 1200 according to an embodiment of this application. The following specifically describes a structure and a function of the network device 1200 with reference to FIG. 12. For example, this application further provides the network device 1200. The network device 1200 may include a sending module 1201, configured to send a first multicast radio network temporary identifier and a first destination layer 2 identifier to a relay device, where there is a correspondence between the first multicast radio network temporary identifier and the first destination layer 2 identifier. The sending module 1201 is further configured to send data to the relay device.

Optionally, the data sent by the sending module 1201 to the relay device includes a first bearer identifier. The first bearer identifier is used by user equipment to map the data of the user equipment to a first bearer.

Optionally, the bearer includes one or more of a signaling radio bearer, a data radio bearer, a radio link control bearer, or a media access control bearer.

Optionally, the sending module 1201 may send the first multicast radio network temporary identifier and the first destination layer 2 identifier to the relay device based on a radio resource control message or a system information broadcast message, where there is the correspondence between the first multicast radio network temporary identifier and the first destination layer 2 identifier.

Figure 13:
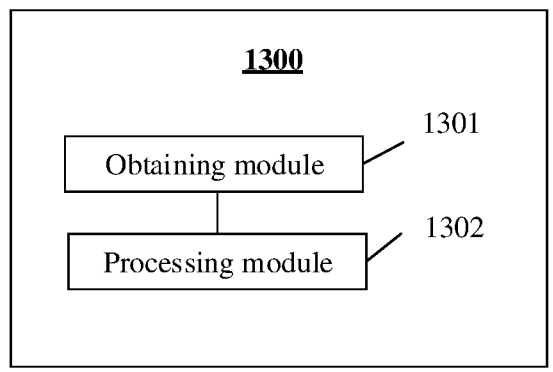
FIG. 13 is a schematic block diagram of user equipment according to an embodiment of this application.

FIG. 13 is a schematic block diagram of user equipment 1300 according to an embodiment of this application. The following specifically describes a structure and a function of the user equipment 1300 with reference to FIG. 13. For example, this application further provides the user equipment 1300. The user equipment 1300 may include an obtaining module 1301, configured to receive data from a relay device through a second link, where the second link is a wireless direct communication link between the relay device and the user equipment.

Optionally, the obtaining module 1301 is configured to receive the data from the relay device through a second bearer.

Optionally, the data includes a first bearer identifier. The user equipment 1300 further includes a processing module 1302. The processing module 1302 is configured to map the data to a first bearer based on the first bearer identifier.

Figure 14:
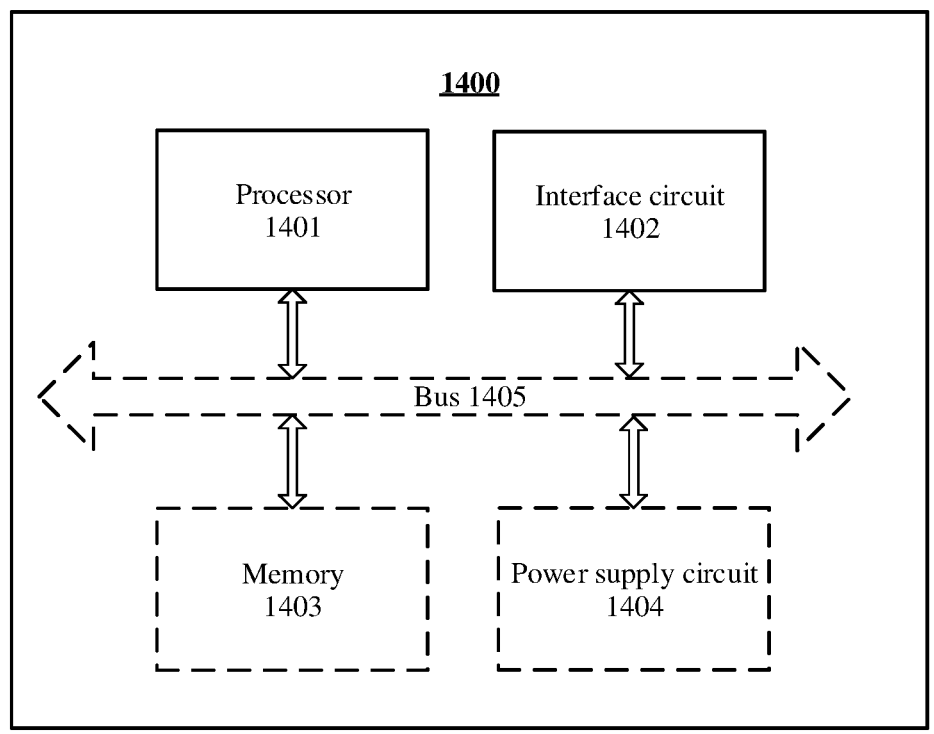
FIG. 14 is a schematic block diagram of an apparatus according to an embodiment of this application.

Based on a same technical conception, an embodiment of this application further provides an apparatus 1400. The following specifically describes a structure and a function of the apparatus 1400 with reference to a schematic block diagram of the apparatus 1400 in FIG. 14. The apparatus may include at least one processor 1401 and an interface circuit 1402. When related program instructions are executed in the at least one processor 1401, the apparatus 1400 may be enabled to perform the communication method and any possible designs of the communication method in any one of the foregoing embodiments. The interface circuit 1402 may be configured to receive the program instructions and transmit the program instructions to the processor. Alternatively, the interface circuit 1402 may be used by the apparatus 1400 to communicate and interact with another communication device, for example, exchange control signaling and/or service data with another communication device. The interface circuit 1402 may be a code and/or data read and write interface circuit, or the interface circuit 1402 may be a signal transmission interface circuit between a communication processor and a transceiver. Optionally, the communication apparatus 1400 may further include at least one memory 1403, and the memory 1403 may be configured to store the related program instructions and/or data that are required. Optionally, the apparatus 1400 may further include a power supply circuit 1404. The power supply circuit 1404 may be configured to supply power to the processor 1401. The power supply circuit 1404 and the processor 1401 may be located in a same chip, or the power supply circuit 1404 may be located in another chip other than a chip in which the processor 1401 is located. Optionally, the apparatus 1400 may further include a bus 1405, and parts of the apparatus 1400 may be interconnected through the bus 1405.

It should be understood that the processor in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitation, many forms of a random access memory (RAM) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), or a direct rambus random access memory (direct rambus RAM, DR RAM).

The power supply circuit in embodiments of this application includes but is not limited to at least one of the following: a power supply line, a power supply subsystem, a power management chip, a power consumption management processor, or a power consumption management control circuit.

The transceiver apparatus, the interface circuit, or the transceiver in embodiments of this application may include a separate transmitter and/or a separate receiver, or the transmitter and the receiver may be integrated. The transceiver apparatus, the interface circuit, or the transceiver may work under an indication of a corresponding processor. Optionally, the transmitter may correspond to a transmitter in a physical device, and the receiver may correspond to a receiver in a physical device.

It may be clearly understood by a person skilled in the art that, for the purpose of convenient and brief description, division of the foregoing functional modules is used as an example for illustration. In actual application, the foregoing functions can be allocated to different functional modules and implemented based on a requirement, in other words, an inner structure of an apparatus is divided into different functional modules to implement all or some of the functions described above. For a specific working process of the foregoing systems, apparatuses, and units, refer to a corresponding process in the foregoing method embodiments, and details are not described herein again.

In embodiments of this application, it should be understood that the disclosed systems, apparatuses, and methods may be implemented in other manners. For example, the described apparatus embodiments are merely examples. For example, the module or unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

A person of ordinary skill in the art may be aware that, in combination with units or algorithm operations in examples described in embodiments disclosed in this specification, functions may be implemented by hardware, software, or a combination of software and hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In this application, "implemented by software" may mean that a processor reads and executes program instructions stored in a memory to implement a function corresponding to the foregoing module or unit. The processor is a processing circuit that has a function of executing the program instructions, and includes but is not limited to at least one of the following: types of processing circuits that can execute the program instructions such as a central processing unit (CPU), a microprocessor, a digital signal processor (DSP), a microcontroller (MCU), or an artificial intelligence processor. In some other embodiments, the processor may further include a circuit that has another processing function (for example, a hardware circuit, a bus, and an interface circuit that are used for hardware acceleration). The processor may be presented in a form of an integrated chip. For example, the process may be presented in a form of an integrated chip whose processing function includes only a function of executing software instructions; or the processor may be presented in a form of a SoC (system-on-a-chip). To be specific, on one chip, in addition to the processing circuit (which is usually referred to as a "core") that can execute the program instructions, another hardware circuit configured to implement a specific function is further included (where certainly, the hardware circuit may also be independently implemented based on an ASIC or an FPGA). Correspondingly, in addition to the function of executing software instructions, processing functions may further include various hardware acceleration functions (such as AI computing, encoding and decoding, and compression and decompression).

In this application, "implemented by hardware" means that a function of the foregoing module or unit is implemented by using a hardware processing circuit that does not have a function of processing program instructions. The hardware processing circuit may consist of discrete hardware components, or may be an integrated circuit. To reduce power consumption and a size, the hardware processing circuit is usually implemented in a form of the integrated circuit. The hardware processing circuit may include an ASIC or a PLD (programmable logic device), where the PLD may further include an FPGA, a CPLD (complex programmable logic device), and the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit that is configured to implement an FPGA function and a CPU may be formed on a silicon base, and are independently packaged into a chip, where the chip is also referred to as a SoPC (system-on-a-programmable-chip).

It should be noted that, when the functions are implemented by using software, hardware, or a combination of software and hardware in this application, different software and hardware may be used, and it is not specified that only one type of software or hardware is used. For example, one of the modules or units may be implemented by using a CPU, and another module or unit may be implemented by using a DSP. Similarly, when this application is implemented by using hardware, one of the modules or units may be implemented by using an ASIC, and another module or unit may be implemented by using an FPGA. Certainly, it is also not specified that some or all modules or units are implemented by using a same type of software (for example, by using the CPU) or a same type of hardware (for example, by using the ASIC). In addition, a person skilled in the art may know that software generally has better flexibility but poorer performance than hardware, while hardware is exactly opposite. Therefore, a person skilled in the art may select software, hardware, or a combination of software and hardware for implementation based on an actual requirement.

In the foregoing embodiments, the descriptions of each embodiment have respective focuses. For a part that is not described in detail in an embodiment, refer to related descriptions in other embodiments. Embodiments of this application may be combined, or some technical features in embodiments may be decoupled from specific embodiments and combined with a conventional technology, to resolve the technical problem in embodiments of this application.

In embodiments of this application, the units described as separate components may or may not be physically separate, and components displayed as units may or may not be physical units, may be located in one position, or may be distributed on a plurality of network units. Some or all of the units may be selected based on an actual requirement to achieve the objectives of the solutions in embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and may include several instructions for instructing a computer device, for example, a personal computer, a server, or a network device, or a processor to perform all or some of the operations of the methods described in embodiments of this application. The foregoing storage medium may include any medium or computer-readable storage medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method, applied to a relay device, the method comprising:
    receiving a data packet from a network device through a first link, and sending the data packet to user equipment through a second link, wherein:
        a protocol stack of the relay device consists of:
            a physical layer, a media access control layer, and a segmentation function or a resegmentation function of a radio link control layer;
            a physical layer, a media access control layer, a segmentation function or a resegmentation function of a radio link control layer, and an adaptation layer, wherein the adaptation layer processes the data packet;
            a physical layer and a hybrid automatic repeat request function of a media access control layer; or
            a physical layer, a hybrid automatic repeat request function of a media access control layer, and an adaptation layer, wherein the adaptation layer processes the data packet; and
        the first link is a wireless communication link between the network device and the relay device, and the second link is a wireless direct communication link between the relay device and the user equipment.

2. The method according to claim 1, wherein receiving the data packet from the network device through the first link, and sending the data packet to the user equipment through the second link comprises:
    receiving the data packet from the network device based on a first multicast radio network temporary identifier through the first link;
    obtaining a first destination layer 2 identifier based on the first multicast radio network temporary identifier, wherein the first multicast radio network temporary identifier corresponds to the first destination layer 2 identifier in a first correspondence; and
    sending the data packet to the user equipment based on the first destination layer 2 identifier through the second link.

3. The method according to claim 2, further comprising:
    receiving the first multicast radio network temporary identifier and the first destination layer 2 identifier from the network device.

4. The method according to claim 2, wherein the first destination layer 2 identifier is comprised in a media access control layer header of the data packet, and the first destination layer 2 identifier identifies the user equipment.

5. The method according to claim 2, further comprising:
    receiving the data packet from the network device through a first bearer;
    determining a second bearer identifier based on a first bearer identifier of the first bearer, wherein the first bearer identifier corresponds to the second bearer identifier in a second correspondence; and
    sending the data packet to the user equipment based on the second bearer identifier.

6. The method according to claim 5, wherein the data packet sent to the user equipment comprises the first bearer identifier, and the first bearer identifier is used to map the data packet of the user equipment to the first bearer.

7. The method according to claim 5, wherein the first bearer comprises one or more of a signaling radio bearer, a data radio bearer, a radio link control bearer, or a media access control bearer.

8. A relay device, comprising:
    at least one processor; and
    a non-transitory computer readable storage medium storing instructions that are executable by the at least one processor, the instructions comprising instructions for:
        receiving a data packet from a network device through a first link; and
        sending the data packet to user equipment through a second link, wherein:
            a protocol stack of the relay device consists of:
                a physical layer, a media access control layer, and a segmentation function or a resegmentation function of a radio link control layer;
                a physical layer, a media access control layer, a segmentation function or a resegmentation function of a radio link control layer, and an adaptation layer, wherein the adaptation layer processes the data packet;
                a physical layer and a hybrid automatic repeat request function of a media access control layer; or
                a physical layer, a hybrid automatic repeat request function of a media access control layer, and an adaptation layer, wherein the adaptation layer processes the data packet; and
            the first link is a wireless communication link between the network device and the relay device, and the second link is a wireless direct communication link between the relay device and the user equipment.

9. The relay device according to claim 8, wherein receiving the data packet from the network device through the first link, and sending the data packet to the user equipment through the second link, comprises:
    receiving the data packet from the network device based on a first multicast radio network temporary identifier through the first link;
    obtaining a first destination layer 2 identifier based on the first multicast radio network temporary identifier, wherein the first multicast radio network temporary identifier corresponds to the first destination layer 2 identifier in a first correspondence; and
    sending the data packet to the user equipment based on the first destination layer 2 identifier through the second link.

10. The relay device according to claim 9, wherein the instructions further comprise instructions for:
    receiving the first multicast radio network temporary identifier and the first destination layer 2 identifier from the network device.

11. The relay device according to claim 9, wherein the first destination layer 2 identifier is comprised in a media access control layer header of the data packet, and the first destination layer 2 identifier identifies the user equipment.

12. The relay device according to claim 9, wherein receiving the data packet from the network device through the first link, and sending the data packet to the user equipment through the second link, comprises:
  receiving the data packet from the network device through a first bearer;
  determining a second bearer identifier based on a first bearer identifier, wherein the first bearer identifier corresponds to the second bearer identifier in a second correspondence; and
  sending the data packet to the user equipment based on the second bearer identifier.

13. The relay device according to claim 12, wherein the data packet sent to the user equipment comprises the first bearer identifier, and the first bearer identifier is used to map the data packet of the user equipment to the first bearer.

14. The relay device according to claim 12, wherein the first bearer comprises one or more of a signaling radio bearer, a data radio bearer, a radio link control bearer, or a media access control bearer.

15. A non-transitory computer-readable storage medium, wherein the computer-readable storage medium stores related program instructions; and when the related program instructions are run, a relay device is caused to:
  receive a data packet from a network device through a first link; and
  send the data packet to user equipment through a second link, wherein:
    a protocol stack of the relay device consists of:
      a physical layer, a media access control layer, and a segmentation function or a resegmentation function of a radio link control layer;
      a physical layer, a media access control layer, a segmentation function or a resegmentation function of a radio link control layer, and an adaptation layer, wherein the adaptation layer processes the data packet;
      a physical layer and a hybrid automatic repeat request function of a media access control layer; or
      a physical layer, a hybrid automatic repeat request function of a media access control layer, and an adaptation layer, wherein the adaptation layer processes the data packet; and
    the first link is a wireless communication link between the network device and the relay device, and the second link is a wireless direct communication link between the relay device and the user equipment.

16. The non-transitory computer-readable storage medium according to claim 15, wherein receiving the data packet from the network device through the first link, and sending the data packet to the user equipment through the second link, comprises:
  receiving the data packet from the network device based on a first multicast radio network temporary identifier through the first link;
  obtaining a first destination layer 2 identifier based on the first multicast radio network temporary identifier, wherein the first multicast radio network temporary identifier corresponds to the first destination layer 2 identifier in a first correspondence; and
  sending the data packet to the user equipment based on the first destination layer 2 identifier through the second link.

17. The non-transitory computer-readable storage medium according to claim 16, wherein the instructions further comprise instructions for:
  receiving the first multicast radio network temporary identifier and the first destination layer 2 identifier from the network device.

18. The non-transitory computer-readable storage medium according to claim 17, wherein the first destination layer 2 identifier is comprised in a media access control layer header of the data packet, and the first destination layer 2 identifier identifies the user equipment.

19. The non-transitory computer-readable storage medium according to claim 16, wherein receiving the data packet from the network device through the first link, and sending the data packet to the user equipment through the second link, comprises:
  receiving the data packet from the network device through a first bearer;
  determining a second bearer identifier based on a first bearer identifier, wherein the first bearer identifier corresponds to the second bearer identifier in a second correspondence; and
  sending the data packet to the user equipment based on the second bearer identifier.

20. The non-transitory computer-readable storage medium according to claim 19, wherein the data packet sent to the user equipment comprises the first bearer identifier, and the first bearer identifier is used to map the data packet of the user equipment to the first bearer.

* * * * *